(12) United States Patent
Onder

(10) Patent No.: US 7,747,993 B2
(45) Date of Patent: Jun. 29, 2010

(54) METHODS AND SYSTEMS FOR ORDERING INSTRUCTIONS USING FUTURE VALUES

(75) Inventor: Soner Onder, Laurium, MI (US)

(73) Assignee: Michigan Technological University, Houghton, MI (US)

( * ) Notice: Subject to any disclaimer, the term of this patent is extended or adjusted under 35 U.S.C. 154(b) by 979 days.

(21) Appl. No.: 11/026,425

(22) Filed: Dec. 30, 2004

(65) Prior Publication Data

US 2006/0150161 A1 Jul. 6, 2006

(51) Int. Cl.
G06F 9/45 (2006.01)
(52) U.S. Cl. ............... 717/159; 717/140; 717/141; 717/160; 717/161; 712/212
(58) Field of Classification Search ......... 717/140–161; 712/216–219
See application file for complete search history.

(56) References Cited

U.S. PATENT DOCUMENTS

| | | | | | |
|---|---|---|---|---|---|
| 5,161,216 | A * | 11/1992 | Reps et al. | ............. | 717/151 |
| 5,367,651 | A * | 11/1994 | Smith et al. | ............. | 717/149 |
| 5,655,122 | A * | 8/1997 | Wu | ............. | 717/152 |
| 5,699,537 | A * | 12/1997 | Sharangpani et al. | ............. | 712/217 |
| 5,724,565 | A * | 3/1998 | Dubey et al. | ............. | 712/245 |
| 5,778,233 | A * | 7/1998 | Besaw et al. | ............. | 717/154 |
| 5,812,811 | A * | 9/1998 | Dubey et al. | ............. | 712/216 |
| 5,881,307 | A * | 3/1999 | Park et al. | ............. | 712/23 |
| 5,961,630 | A * | 10/1999 | Zaidi et al. | ............. | 712/200 |
| 6,115,808 | A * | 9/2000 | Arora | ............. | 712/219 |
| 6,128,775 | A * | 10/2000 | Chow et al. | ............. | 717/156 |
| 6,182,284 | B1 * | 1/2001 | Sreedhar et al. | ............. | 717/146 |
| 6,401,195 | B1 * | 6/2002 | Arora et al. | ............. | 712/218 |
| 6,434,590 | B1 * | 8/2002 | Blelloch et al. | ............. | 718/102 |
| 6,516,462 | B1 * | 2/2003 | Okunev et al. | ............. | 717/154 |
| 6,526,572 | B1 * | 2/2003 | Brauch et al. | ............. | 717/154 |
| 6,587,940 | B1 * | 7/2003 | Soltis et al. | ............. | 712/216 |
| 6,643,767 | B1 * | 11/2003 | Sato | ............. | 712/219 |
| 6,675,380 | B1 * | 1/2004 | McKinsey et al. | ............. | 717/161 |
| 6,877,088 | B2 * | 4/2005 | Dice | ............. | 712/235 |
| 6,948,162 | B2 * | 9/2005 | Kalogeropulos | ............. | 717/159 |
| 7,269,827 | B2 * | 9/2007 | Metzger | ............. | 717/151 |
| 2003/0033510 | A1 * | 2/2003 | Dice | ............. | 712/235 |
| 2003/0101442 | A1 * | 5/2003 | Wu | ............. | 717/156 |
| 2003/0145313 | A1 * | 7/2003 | Kalogeropulos | ............. | 717/156 |
| 2003/0196197 | A1 * | 10/2003 | Fu et al. | ............. | 717/161 |
| 2004/0261068 | A1 * | 12/2004 | Ju | ............. | 717/159 |
| 2005/0039167 | A1 * | 2/2005 | Fernandes et al. | ............. | 717/116 |

(Continued)

OTHER PUBLICATIONS

R.M. Tomasulo; An Efficient Algorithm for Exploiting Multiple Arithmetic Units; IBM Journal of Research and Development; Jan. 1967; pp. 25-33; vol. 11, No. 1.

(Continued)

*Primary Examiner*—Wei Y Zhen
*Assistant Examiner*—Matthew J Brophy
(74) *Attorney, Agent, or Firm*—Michael Best & Friedrich LLP

(57) ABSTRACT

A method of ordering instructions. The method can include placing a first instruction that consumes a value of an object before a second instruction that produces the value of the object such that the first instruction is processed before the second instruction and a physical location is allocated to the value of the object upon processing the first instruction.

43 Claims, 23 Drawing Sheets

U.S. PATENT DOCUMENTS

| | | | |
|---|---|---|---|
| 2005/0055541 A1* | 3/2005 | Aamodt et al. | 712/217 |
| 2005/0138480 A1* | 6/2005 | Srinivasan et al. | 714/38 |
| 2005/0289530 A1* | 12/2005 | Robison | 717/159 |
| 2006/0090063 A1* | 4/2006 | Theis | 712/239 |

OTHER PUBLICATIONS

James E. Smith; A Study of Branch Prediction Strategies; Proceedings of the 8$^{th}$ Annual Symposium on Computer Architecture; May 12-14, 1981; pp. 135-148; IEEE Computer Society and ACM SIGARCH; Minneapolis, Minnesota.

J.R. Allen, Ken Kennedy, Carrie Porterfield, and Joe Warren; Conversion of Control Dependence to Data Dependence; Conference Record of the 10$^{th}$ Annual ACM Symposium on Principles of Programming Languages; Jan. 24-26, 1988; pp. 177-1988; ACM SIGACT-SIGPLAN; Austin Texas.

Bowen Alpern, Mark N. Wegman, and F. Kenneth Zadeck; Detecting Equality of Variables in Programs; Conference Record of the 15$^{th}$ Annual ACM Symposium on Principles of Programming Languages; Jan. 13-15, 1988; pp. 1-11; ACM Press.

Susan Howitz, Jan Prins, and Thomas Reps; On the Adequacy of Program Dependence Graphs for Representing Programs; Proceedings of the 15$^{th}$ Annual ACM SIGACT-SIGPLAN Symposium on Principles of Programming Languages; Jan. 13-15, 1998; pp. 146-157; ACM Press.

Ron Cytron, Jeanne Ferrante, Barry K. Rosen, Mark N. Wegman, and F. Kenneth Zadeck; An Efficient Method of Computing Static Single Assignment Form; Conference Record of the 16$^{th}$ Annual ACM Symposium on Principles of Programming Languages; Jan. 11-13, 1989; ACM SIGACT-SIGPLAN and ACM Press; Austin, Texas.

James R. Larus; SPIM S20: A MIPS R2000 Simulator; Technical Report CS-TS-90-966; 1990; pp. 1-25; Computer Science Department, University of Wisconsin Madison.

Robert A. Ballance, Arthur B. MacCabe, and Karl J. Ottenstein; The Program Dependence Web: A Representation Supporting Control-, Data-, and Demand-Driven Interpretation of Imperative Languages; Proceedings of the ACM SIGPLAN 1990 Conference on Programming Language Design and Implementation; Jun. 20-22, 1990; pp. 257-271; White Plains, New York.

Tse-Yu Yeh and Yale N. Patt; Two-level Adaptive Training Branch Prediction; Proceedings of the 24$^{th}$ Annual International Symposium on Microarchitecture; Nov. 18-20, 1991; pp. 51-61; 1991; ACM SIGNMICRO and IEEE Computer Society TC-MICRO; Albuquerque, New Mexico.

Tse-Yu Yeh and Yale N. Patt; Alternative Implementations of Two-Level Adaptive Branch Prediction; Proceedings of the 19$^{th}$ Annual International Symposium on Computer Architecture; May 19-21, 1992; pp. 124-134; Gold Coast, Australia.

Shien-Tai Pan, Kimming So, and Joseph T Rahmeh; Improving the Accuracy of Dynamic Branch Prediction Using Branch Correlation; Proceedings of the 5$^{th}$ International Conference on Architectural Support for Programming Languages and Operating Systems; Oct. 12-15, 1992; pp. 76-84.

Cecile Moura; Super DLX: A Generic Superscalar Simulator; ACAPS Technical Memo 64; Apr. 13, 1993; pp. 1-78; School of Computer Science, McGill University.

Scott McFarling; Combining Branch Predictors; WRL Technical Note TN-36; Jun. 1993; pp. 1-25; Digital Western Research Laboratory; Palo Alto, California.

Brad Calder and Dirk Grunwald; Fast & Accurate Instruction Fetch and Branch Prediction; Proceedings of the 21$^{st}$ Annual International Symposium and Computer Architecture; Apr. 18-21, 1994; pp. 2-11; IEEE Computer Society TCCA and ACM SIGAECH Computer Architecture News.

Jens Knoop, Oliver Ruthing, and Bernhard Steffen; Partial Dead Code Elimination; Proceedings of the ACM SIGPLAN 1994 Conference on Programming Language Design and Implementation; Jun. 20-24, 1994; pp. 147-158; Orlando, Florida.

Po-Yung Chang, Eric Hao, Tse-Yu Yeh, and Yale Patt; Branch Classification: a New Mechanism for Improving Branch Predictor Performance; Proceedings of the 27$^{th}$ Annual International Symposium on Microarchitecture; Nov. 1994; pp. 22-31; San Jose, California.

James R. Larus and Eric Schnarr; EEL: Machine-Independent Executable Editing; Proceedings of the ACM SIGPLAN 1995 Conference on Programming Language Design and Implementation, SIGPLAN Notices; Jun. 18-21, 1995; pp. 291-300; vol. 30, No. 6; La Jolla, California.

Po-Yung Chang, Marius Evers, and Yale N. Patt; Improving Branch Prediction Accuracy by Reducing Pattern History Table Interference; Proceedings of the 1996 Conference on Parallel Architectures and Compilation Techniques; Oct. 20-23, 1996; pp. 48-57; Boston, Massachusetts; Oct. 1996; pp. 48-57; IEE Computer Society Press.

Eric Rotenberg, Steve Bennett, and James E. Smith; Trace Cache: a Low Latency Approach to High Bandwidth Instruction Fetching; Proceedings of the 29$^{th}$ Annual International Symposium on Microarchitecture; Jan. 9-13, 1999; pp. 24-34; IEEE Computer Society TCCA; Paris, France.

Doug Burger and Todd M. Austin; The SimpleScalar Tool Set, Version 2.0; University of Wisconsin-Madison Computer Science Department Technical Report #1342; Jun. 1997; pp. 1-21.

Deszo Sima, Terence Fountain, and Peter Kacsuk; Advanced Computer Architectures: A Design Space Approach; 1997; pp. 559-563; Addison-Wesley.

Mikko H. Lipasti and John Paul Shen; Superspeculative Microarchitecture for Beyond AD 2000; IEEE CS Press Book (Companion CD); Sep. 1997; pp. 59-66; vol. 30, No. 9.

Yale N. Patt, Sanjay J. Patel, Marius Evers, Daniel H. Friendly, and Jared Stark; One Billion Transistors, One Uniprocessor, One Chip; IEE Computer; Sep. 1997; pp. 51-57; vol. 30, No. 9.

James E. Smith, and Sriram Vajapeyam; Trace Processors: Moving to Fourth-Generation Microarchitectures; Sep. 1997; pp. 68-74; IEEE Computer.

Eric Sprangle, Robert S. Chappell, Mitch Alsup, and Yale N. Patt; The Agree Predictor: A Mechanism for Reducing Negative Branch History Interference; Proceedings of the 24$^{th}$ International Conference on Computer Architecture; 1997; pp. 284-291; Denver, Colorado.

Rastislav Bodik and Rajiv Gupta; Partial Dead Code Elimination using Slicing Transformations; Proceedings of the ACM SIGPLAN 1997 Conference on Programming Language Design and Implementation, SIGPLAN Notices; Jun. 15-18, 1997; pp. 159-170; vol. 32, No. 6; Las Vegas, Nevada.

Rajiv Gupta, David A. Berson, and Jesse Z. Fang; Path Profile Guided Partial Dead Code Elimination Using Prediction; Proceedings of the 1997 International Conference on Parallel Architectures and Compilation Techniques; Nov. 10-14, 1997; pp. 102-113; IEEE Computer Society Press; San Fransisco, CA.

Daniel Homes Friendly, Sanjay Jeram Patel, and Yale N. Patt; Alternative Fetch and Issue Policies for the Trace Cache Fetch Mechanism; Proceedings of the 30$^{th}$ Annual IEEE-ACM International Symposium on Microarchitecture; Dec. 1997; pp. 24-33.

Chih-Chieh Lee, I-Cheng K. Chen, and Trevor N. Mudge; The Bi-Mode Branch Predictor; Proceeding of the 30$^{th}$ Annual International Symposium on Microarchitecture; Dec. 1-3, 1997; pp. 4-13; IEEE Computer Society TC-Micro and ACM SIGMICRO; Triangle Part, North Carolina.

Antonio Gonzalez, Jose Gonzalez, and Mateo Valero; Virtual-Physical Registers; Proceedings of the 4$^{th}$ International Symposium on High-Performance Computer Architecture; Jan. 31-Feb. 4, 1998; pp. 1-10; IEEE Computer Society TCCA; Las Vegas, Nevada.

Soner Onder and Rajiv Gupta; Automatic Generation of Microarchitecture Simulators; Proceedings of the IEEE International Conference on Computer Languages; May 1998; pp. 1-10; Chicago.

George Z. Chrysos and Joel S. Emer; Memory Dependence Prediction using Store Sets; Proceedings of the 25$^{th}$ International Conference on Computer Architecture; Jun. 1998; pp. 142-153.

A.N. Eden and T. Mudge; The YAGS Branch Prediction Scheme; Proceedings of the 31$^{st}$ Annual International Symposium on Microarchitecture; Nov. 30-Dec. 2, 1998; pp. 69-77; IEEE Computer Society TC-MICRO and ACM SIGMICRO; Dallas, Texas.

Daniel Holmes Friendly, Sanjay Jeram Patel, and Yale N. Patt; Putting the Fill Unit to Work: Dynamic Optimizations for Trace Cache Microprocessors; Proceedings of the 31$^{st}$ Annual International Symposium on Microarchitecture; Nov. 30-Dec. 2, 1998; pp. 173-181; IEEE Computer Society TC-MICRO and ACM SIGMICRO; Dallas, Texas.

Karel Driesen and Urs Holzle; Accurate Indirect Branch Prediction; Proceedings of the 25$^{th}$ International Conference on Computer Architecture; 1998; pp. 167-178.

Eric Rotenberg, Quinn Jacobson, and Jim Smith; A Study of Control Independence in Superscalar Processors; Proceedings of the 5$^{th}$ International Symposium on High-Performance Computer Architecture; Jan. 9-13, 1999; pp. 115-124; IEEE Computer Society TCCA; Orlando, Florida.

Sriram Vajapeyam, P.J. Joseph, and Tulika Mitra; Dynamic Vectorization: A Mechanism for Exploiting Far-Flung ILP in Ordinary Programs; Proceedings of the 26$^{th}$ Annual International Symposium on Computer Architecture, Computer Architecture News; May 2-4, 1999; pp. 16-27; vol. 27, No. 2; IEEE Computer Society TCCA and ACM SIGARCH; Atlanta, Georgia.

Bryan Black, Bohuslav Rychlik, and John Paul Shen; The Block-based Trace Cache; Proceedings of the 26$^{th}$ International Conference on Computer Architecture; May 1999; pp. 196-207.

Yuan Chou, Jason Fung, and John Paul Shen; Reducing Branch Misprediction Penalties Via Dynamic Control Independence Detection; Conference Proceedings of the 1999 International Conference on Supercomputing, Rhodes; Jun. 20-25, 1999; pp. 109-118; ACM SIGARCH; Rhodes, Greece.

Kevin Skadron; Characterizing and Removing Branch Mispredictions; PhD Thesis, Princeton University; Jun. 1999; pp. 1-229.

Soner Onder; Scalable Superscalar Processing; PhD Thesis, University of Pittsburgh; Jul. 1999; pp. 1-158.

Soner Onder, Jun Xu, and Rajiv Gupta; Caching and Predicting Branch Sequences for Improved Fetch Effectiveness; Proceedings of the International Conference on Parallel Architectures and Compilation Techniques; Oct. 1999; pp. 1-9.

Teresa Monreal, Antonio Ganzalez, Mateo Valero, Jose Gonzalez, and Victor Vinals; Delaying Physical Register Allocation Through Virtual-Physical Registers; Proceedings of the 32$^{nd}$ Annual International Symposium on Microarchitecture; Nov. 1999; pp. 186-192; Haifa, Israel.

Eric Rotenberg and Jim Smith; Control Independence in Trace Processors; Proceedings of the 32$^{nd}$ Annual International Symposium on Microarchitecture, Nov. 16-18, 1999; pp. 4-15; Haifa, Israel.

Amir Roth and Gurindar S. Sohi; Register Integration: A Simple and Efficient Implementation of Squash Reuse; Proceedings of the 33$^{rd}$ Annual International Symposium on Microarchitecture; Dec. 10-13, 2000; pp. 223-234; IEEE Computer Society TC-MICRO and ACM SIGMICRO; Monterey California.

Daniel A. Jimenez and Calvin Lin; Dynamic Branch Prediction with Perceptronds; Proceedings of the 7$^{th}$ International Symposium on High-Performance Computer Architecture; Jan. 20-24, 2001; pp. 197-206; Monterrey, Mexico.

Chen-Yong Cher and T. N. Vijaykumar; Skipper: A Microarchitecture for Exploiting Control-flow Independence; Proceedings of the 34$^{th}$ Annual International Symposium on Microarchitecture; Dec. 1-5, 2001; pp. 4-15; IEEE Computer Society TC-MICRO and ACM SIGMICRO; Austin, Texas.

Soner Onder and Rajiv Gupta; Dynamic Memory Disambiguation in the Presence of Out-of-order Store Issuing; Journal of Instruction Level Parallelism; Jun. 2002; pp. 170-176; vol. 4.

John L. Hennessy and David A. Patterson; Computer Architecture: A Quantitative Approach, 3$^{rd}$ Edition; 2002; pp. 313-314 and A1-A66; Morgan Kaufmann Publishers, Inc.

Vinay S. Belgaumkar; General Dynamic Predication for SuperScalar Processors; Masters Thesis, Michigan Technological University; Jan. 2003; pp. 1-63.

* cited by examiner

METHODS AND SYSTEMS FOR ORDERING INSTRUCTIONS USING FUTURE VALUES

BACKGROUND OF THE INVENTION

Embodiments of the invention relate to methods and systems for ordering software instructions using future values. In particular, embodiments of the invention relate to methods and system for ordering a first instruction that consumes a value of an object such that it is processed before a second instruction that defines the value of the object.

Traditionally, data dependencies form the basis of instruction ordering. In other words, in order for instruction ordering to be semantically correct, the production or definition of a value of an object must precede any consumption of the value of the object.

Following traditional instruction ordering, processors assign producer instructions (i.e., instructions that produce a value) a production tag (e.g., a name or an identifier). Typically, a production tag includes a physical location of the processor, such as a register, that will store the generated or produced value. Processors then provide consumer instructions (i.e., instructions that consume a value produced with a producer instruction) with tags assigned to producer instructions that provide the values consumed with the consumer instructions. Processors then hold the consumer instructions in specific buffers of a processor, often called reservation stations. When the processor finishes processing a producer instruction, the processor signals the availability of the value produced with the producer instruction. The processor then releases any consumer instructions holding a tag matching the tag of the completed producer instruction.

SUMMARY OF THE INVENTION

The instruction-ordering requirement as described above limits the reordering or reorganizing of instructions. However, reorganizing instructions is often beneficial to processors configured to continue processing (i.e., fetching and scheduling execution of) instructions without waiting for the results of previously processed instructions to become available.

Accordingly, embodiments of the invention provide a method of ordering software instructions. The method includes placing a first instruction that consumes a value of an object before a second instruction that produces the value of the object such that the first instruction is processed before the second instruction and a physical location is allocated to the value of the object upon processing the first instruction.

Additional embodiments provide a method of processing software instructions. The method includes allocating a physical location to a value of an object, upon encountering a first instruction that consumes a value of an object that is not defined. The method also includes mapping the value produced with a second instruction that produces the value of the object to the physical location.

Another embodiment provides a computer-readable medium including instructions for organizing an instruction set. The instruction set includes a first instruction that consumes a value of an object and a second instruction that produces the value of the object. The computer-readable medium includes instructions for ordering the instructions sequentially such that the first instruction is before the second instruction. The computer-readable medium also includes instructions for flagging the object referenced in the first instruction as a future value object.

Some additional embodiments provide a system for organizing and processing an instruction set. The instruction set includes a first instruction that consumes a value of an object and a second instruction that produces the value of the object. The system includes an instruction organizing application configured to order the instructions sequentially such that the first instruction is before the second instruction and to flag the object referenced in the first instruction as a future value object. The system also includes a processor configured to allocate a physical location to the value of the object upon processing the first instruction and to map the value produced with the second instruction to the physical location.

Further embodiments provide a method of processing a repeated instruction. The method includes fetching a repeated instruction, executing the repeated instruction, and holding a first copy of the repeated instruction with a predicate upon releasing the repeated instruction for execution where the predicate has a true state and a false state.

Yet another embodiment provides an instruction organizer. The instruction organizer includes an instruction-ordering module configured to place a first instruction that consumes a value of an object before a second instruction that produces the value of the object. The instruction organizer also includes a future-value-object-flagging module configured to flag a reference to the object included in the first instruction as a reference to a future value object.

Embodiments also provide a processor. The processor includes a renamer configured to 1) obtain a first instruction including a future value object flag and a reference to a first object, 2) to allocate a first physical location for a value of the object and map the reference to the first object to the first physical location if the future value object flag is set, and, 3) if the future value object flag is not set, to map the reference to the first object to a previously-allocated physical register as designated with a previously-allocated physical location identifier stored in a map table.

Other embodiments provide a renamer. The renamer includes a map table configured to store previously-allocated physical location identifiers that map an object identifier to a physical location, to receive an object identifier, and to transmit a previously-allocated physical location identifier and a physical location allocator configured to receive a future value object flag and to allocate a first physical location and transmit a first physical location identifier associated with the first physical location if the future value object flag is set.

Other features and advantages of embodiments of the invention will become apparent to those skilled in the art upon review of the following detailed description and drawings.

Figure 1:
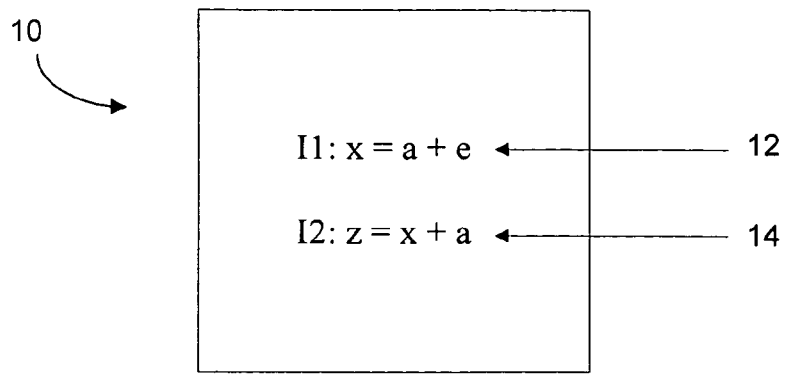
FIG. 1 illustrates an exemplary instruction set representing traditional instruction ordering.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

FIG. 1 illustrates an exemplary instruction set 10 representing traditional instruction ordering or flow. The instruction set 10 includes a first instruction 12 labeled as "I1" and a second instruction 14 labeled as "I2." The first instruction 12 and the second instruction 14 include a reference to an object or variable x. In terms of the object or variable x, the first instruction 12 is a producer instruction since it produces a value for the object x, and the second instruction 14 is a consumer instruction since it consumes the value of the object x. As described above, the instruction set 10 represents traditional instruction ordering since the consumption of the value of the object x sequentially follows the definition or production of the value of the object x.

Figure 2:
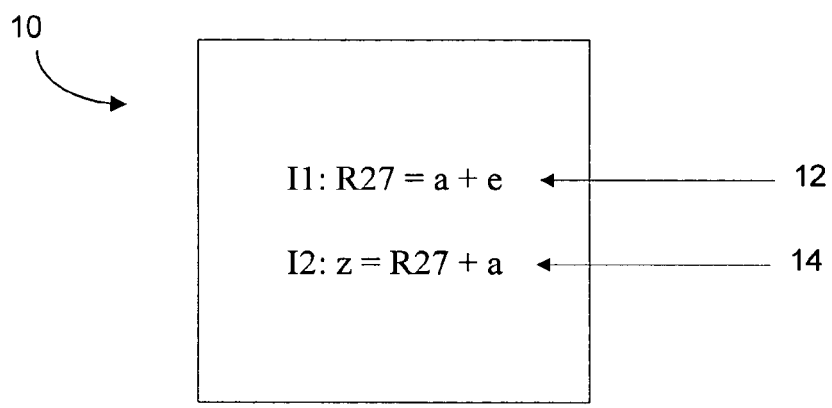
FIG. 2 illustrates an exemplary renaming process performed with a processor upon encountering the instruction set of FIG. 1.

FIG. 2 illustrates an exemplary renaming process performed with a processor encountering or processing the instruction set 10. Upon fetching the first instruction 12, the processor selects an available physical location (e.g., a register) for a value of the object x and replaces the object identifier x in the first instruction 12 with a name or identifier associated with the selected physical location. In the example illustrated in FIG. 2, the object identifiers is replaced with the physical location identifier R27. When the second instruction 14, which consumes the value of the object x, is fetched, the object identifier x in the second instruction 14 is also replaced with the location identifier, R27, such that the first instruction 12 and the second instruction 14 map or associate the value of the object x to the same physical location. In some embodiments, a processor uses a map table to replace all references to a particular object identifier to the same location. The processor can also select or allocate a virtual physical location or tag for a value of the object x. The processor can then map the virtual physical location or tag to a true physical location when a value for the object x is available.

Figure 3:
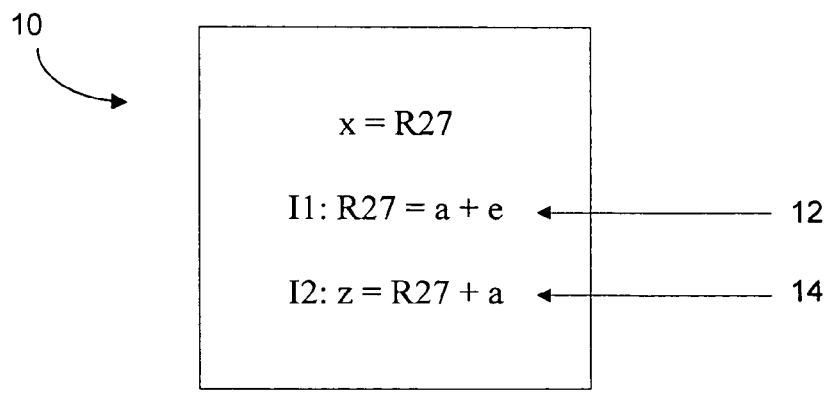
FIG. 3 illustrates another exemplary renaming process performed with a processor upon encountering the instruction set of FIG. 1.

FIG. 3 illustrates another exemplary renaming process performed with a processor with respect to the instruction set 10 of FIG. 1. As illustrated in FIG. 3, the creation of the association between the object identifier x and the physical location identifier R27 is not bound to a specific instruction, and the processor creates an association between the object identifier x and the physical location identifier R27 before encountering the first instruction 12 or the second instruction 14. Upon encountering the first instruction 12 and the second instruction 14, the processor replaces the object identifier x with the previously associated physical location identifier R27.

As illustrated in FIG. 3, the creation of the association between an object identifier and a physical location identifier R27 can be separated from the encountering of a producer instruction initially defining or introducing the object identifier while maintaining correct instruction ordering semantics. Consequently, it becomes irrelevant as to whether the producer instruction or the consumer instruction is encountered first.

In some embodiments, traditional instruction ordering can be reversed or disregarded by identifying an instruction that includes an object identifier that will be the first reference to the object identifier encountered with the processor regardless of whether the instruction is a producer of the value of the object identifier or a consumer of the value of the object identifier.

Figure 4:
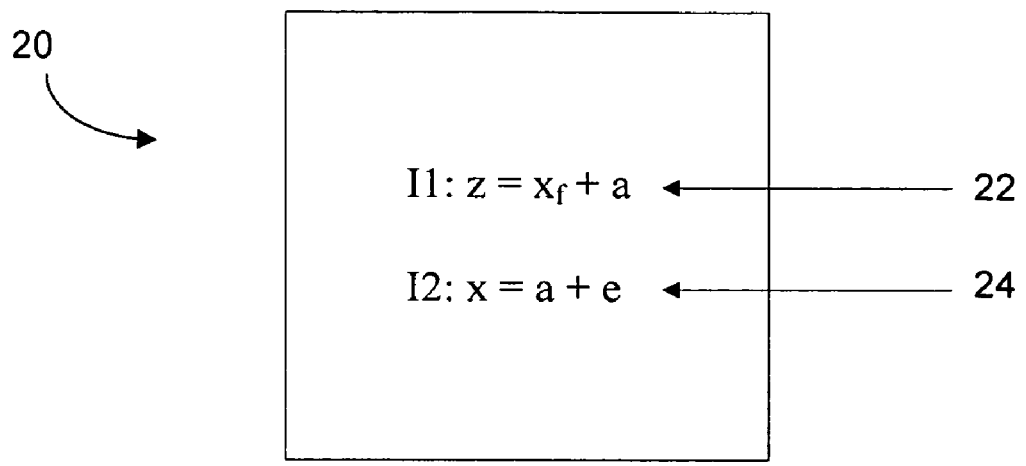
FIG. 4 illustrates another exemplary instruction set representing future value instruction ordering.

FIG. 4 illustrates another exemplary instruction set 20 representing future value or reverse instruction ordering. The instruction set 20 includes a first instruction 22 labeled as "I1" and a second instruction 24 labeled as "I2." In contrast to the instruction set 10, the first instruction 22 is a consumer instruction with respect to object identifier x, since the first instruction 22 consumes a value of the object x. The second instruction 24 is a producer instruction with respect to object identifier x, since the second instruction 24 produces the value of the object x. The instruction set 20 represents future value instruction ordering, which deviates from traditional instruction ordering since the consumption of the value of the object x comes before the definition or production of a value of the object x.

In some embodiments, to maintain proper instruction ordering semantics, the object x is flagged as a "future value object" in the first instruction 22 (illustrated $x_f$ in FIG. 4). The flagging of the object x as a future value object indicates that the value of the object x will be defined or produced in the "future." The "future" can include the future processing of the instruction that includes the flagged object or the processing of a subsequent instruction.

It should be understood that an instruction set representing future value instruction ordering can include multiple consumer instructions sequentially ordered before a corresponding producer instruction, and, in some embodiments, the flagging of the object x as a future value object indicates that the reference to the object x is the first reference to be encountered with the processor upon processing the instruction set. In other words, only the first reference to a value of an object is flagged as a future value object when multiple consumptions of the value occur before the corresponding production of the value. For example, for a sequence of instructions {$consumer_1$, $consumer_2$, . . . , $consumer_n$, producer}, only the reference to the object in the $consumer_1$ instruction is flagged as a future value object identifier since the reference is the first reference of the object identifier encountered with a processor when processing the sequence. Likewise, the references to the object in the remaining consumer instruction, as well as the producer instruction, will not be flagged as a future value object.

Figure 5:
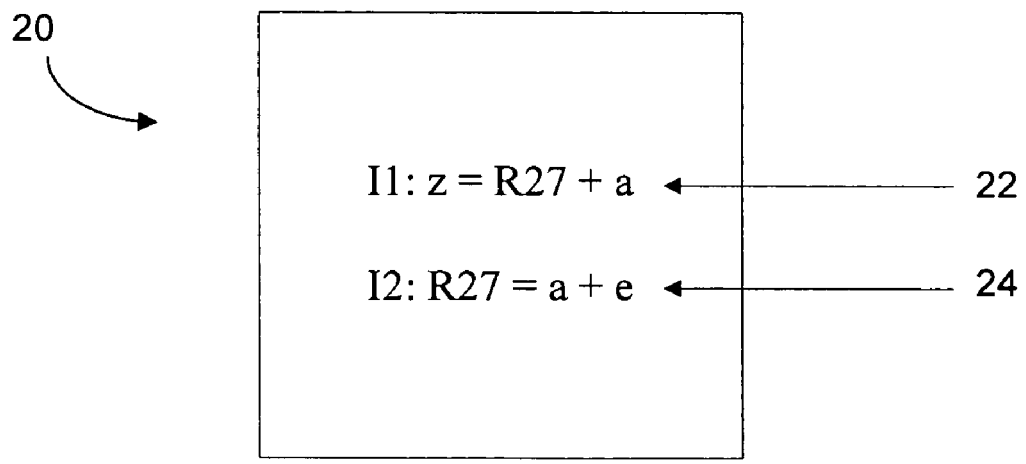
FIG. 5 illustrates an exemplary renaming process performed with a processor upon encountering the instruction set of FIG. 4.

FIG. 5 illustrates an exemplary renaming process performed with a processor upon encountering the instruction set 20. In some embodiments, if an object identifier flagged as a future value object is referenced as consuming a value of an object, the processor treats the consumption of a value of an object as it would traditionally treat a definition or production of the value of the object and allocates a physical location for the value of the object. Subsequent references to the value of the object are then mapped to the same physical location.

In some embodiments, since the value consumed with the first instruction 22 is produced in the future, the processing of the first instruction 22 is halted or held until the value consumed with the first instruction is produced or becomes available. When the producer instruction (e.g., the second instruction 24) producing the value of the object is finally encountered, the processor maps or renames the object identifier to the same physical location previously allocated.

It should be understood that instructions representing traditional instruction ordering can also reference objects flagged as future value objects. For example, an instruction set includes a sequence of instructions {producer, $consumer_1$, $consumer_2$, $consumer_n$}, which represent traditional instruction ordering. As described above, an object can be flagged as a future value object if a value of the object reference with the instruction is going to be defined or produced in the "future." The "future" can include the processing of the instruction including the object flagged as a future value object or the processing of a subsequent instruction. Therefore, the reference to the object included in the producer instruction of the above sequence is flagged as a future value object since the value of the object will be defined in the future with the processing (i.e., the execution) of the producer instruction. Likewise, each reference to the object identifier in the consumer instructions will not be flagged as a future value object since the value of the object consumed with the consumer instructions is defined or produced in the past (rather than in the future) with the processing of the producer instruction.

In some embodiments, ordering instructions in non-traditional or future value instruction order as described above, allows instructions to be reordered or reorganized to improve or increase processing power of a processor. For example, processors performing instruction level parallelism often reorder instructions to avoid instruction processing pipeline interruptions due to processing branch instructions, data-dependent instructions, and/or resource-conflicting instructions.

Branch instructions can disrupt the normal sequential flow of a program since a processor may not be able to determine a subsequent instruction to process until after the branch instruction is processed. Since a processor using instruction level parallelism starts processing (i.e., fetches) subsequent instructions before it finishes processing previous instructions, the processor may not know which subsequent instruction to start processing because it has not finished processing a branch instruction.

One attempt to solve processing conflicts due to branch instructions is to reorganize the order of the instructions such that branch-independent instructions (i.e., instructions that do not depend on the processing of a branch instruction and, therefore, will be processed regardless of the results of processing the branch instruction) are processed in parallel with the processing of the branch instruction. By processing branch-independent instructions before processing branch-dependent instructions (i.e., instructions that may or may not be processed depending on the result of processing the branch instruction), the processing of control-dependent instructions can be delayed until the branch instruction is processed and the processor knows what instructions should be processed next.

Data-dependent instructions can also hinder processing performance since the processing of a data-dependent instruction can depend on the results of another instruction that may or may not be finished processing. In some embodiments, if a data-dependent instruction is processed too closely to the instruction that the data-dependent instruction depends on, the processing of the instruction that the data-dependent instruction depends on may not be finished and the results may not be ready or available. In some situations, instructions may be reordered to increase the time between processing a data-dependent instruction and the instruction that the data dependent instruction depends on to allow more time for the instruction that the data-dependent instruction depends on to process such that the results are available for the data-dependent instruction when the data-dependent instruction is processed.

Resource-conflicting instructions can also cause instruction processing delays since resource-conflicting instructions are instructions processed in parallel where each instruction requires access to a particular resource, such as a memory module. In some embodiments, reordering the resource conflicting instructions such that they do not require access simultaneously reduces potential conflicts.

In some embodiments, future value instruction ordering allows greater freedom to reorder instructions to accommodate branch instruction processing, data-dependent instruction processing, and/or resource-conflicting instruction processing since consumer instructions can be placed before producer instructions without violating instruction ordering semantics.

Figure 6:
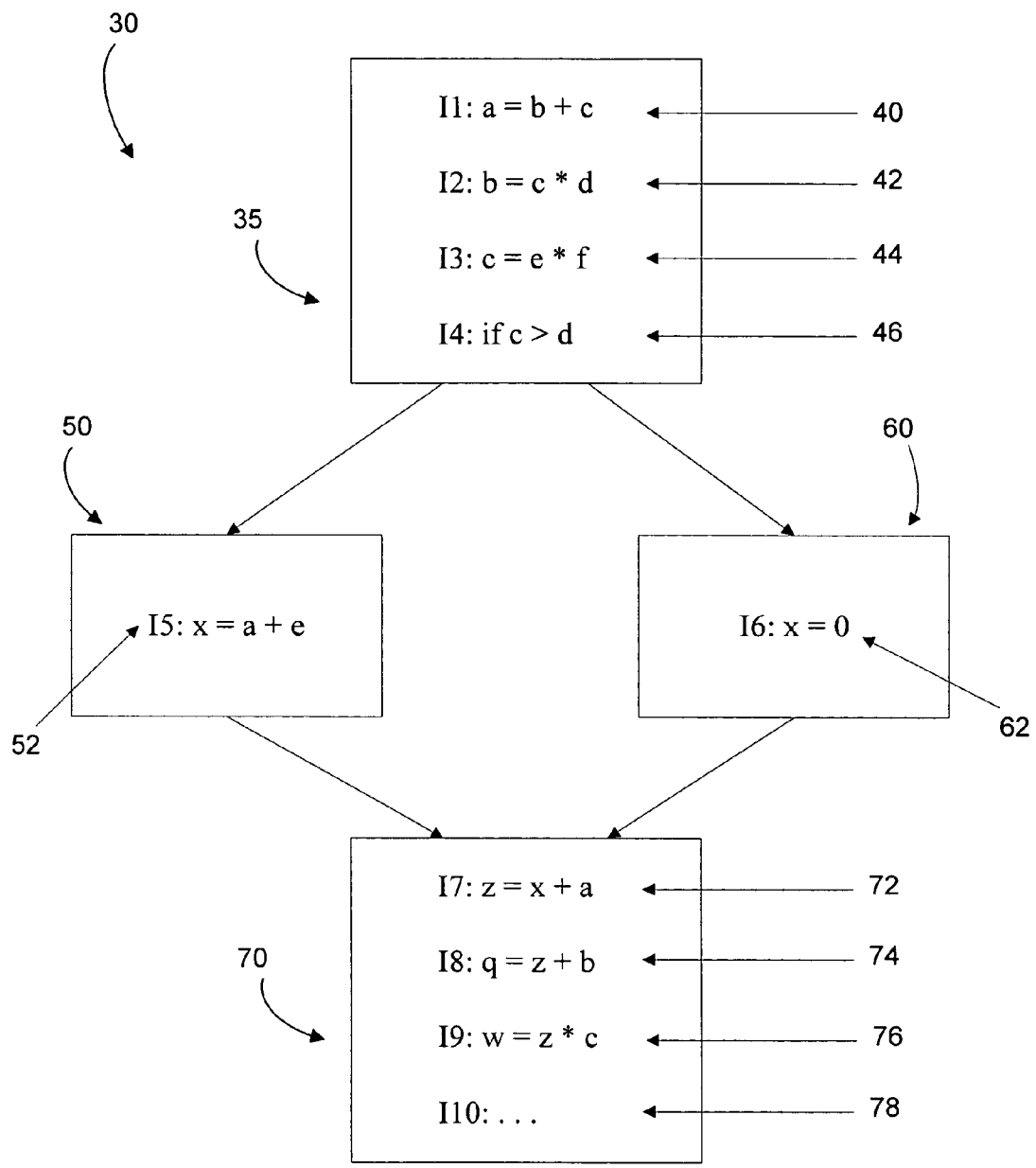
FIG. 6 illustrates an exemplary instruction set representing traditional instruction ordering.

FIG. 6 illustrates an exemplary instruction set 30. In some embodiments, a processor performing instruction level parallelism processes the instruction set 30. Performing instruction level parallelism allows the processor to process multiple instructions in parallel. For the instruction set 30 illustrated in FIG. 6, an exemplary processor may be configured to process four instructions in parallel and may fetch four instructions per cycle. The processor may also be configured to process an instruction in one cycle. Given the above configurations for a processor processing the instruction set 30, the processor can fetch the first subset 35 of the instruction set 30 on a first clock cycle. The first subset 35 can include a first instruction 40 labeled "I1," a second instruction 42 labeled "I2," a third instruction 44 labeled "I3," and a fourth instruction 46 labeled "I4." The fourth instruction 46 includes a branch instruction, and, in some embodiments, processing the fourth instruction 46 can determine a branch direction and, consequently, subsequent instructions to process.

In some embodiments, in order to maintain or fill the instruction pipeline, a processor continues to process instructions and, therefore, continues to fetch instructions after fetching the first subset 35 of instructions. The instruction set 30, however, provides two possible branch directions, and each possible branch direction includes control-dependent instructions that may or may not be processed depending on the processing of the branch instruction included in the fourth instruction 46. The instruction set 30 includes a first possible branch path represented with a second subset 50 that includes a fifth instruction 52 labeled "I5." The instruction set 30 also include a second possible branch path represented with a third subset 60 that includes a sixth instruction 62 labeled "I6."

The instruction set 30 further includes a fourth subset 70 that includes control-independent instructions that are processed regardless of which possible branch path is processed. The fourth subset 70 can include a seventh instruction 72 labeled "I7," an eighth instruction 74 labeled "I8," a ninth instruction 76 labeled "I9," and a tenth instruction 78 labeled "I10."

Figure 7:
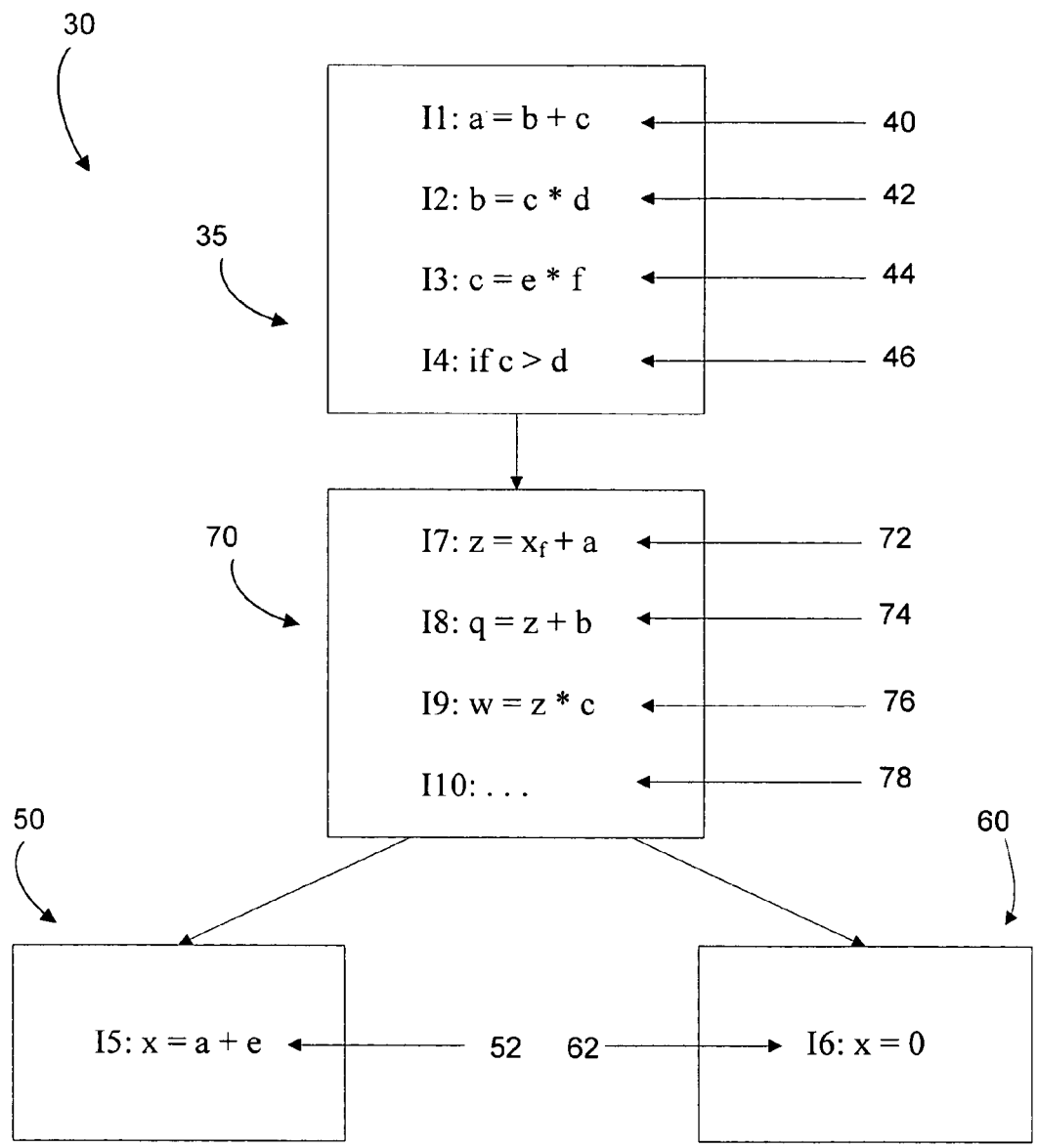
FIG. 7 illustrates the instruction set of FIG. 6 reordered using future value instruction ordering.

In some embodiments, the processor reorders the instruction set 30 to accommodate the processing of the branch instruction using future value instruction ordering. As illustrated in FIG. 7, upon fetching the first subset 35 of instructions, the processor can determine that a branch instruction has been encountered and can reorder the instruction set 30 to place instructions included in the fourth subset 70, which includes control-independent instructions, immediately after the first subset 35. As described above, using future value instruction ordering, the fourth subset 70 can be moved since moving the subset 70 places a consumption of the value of the object x before the production of the value of the object x (which is included in the second subset 50 or the sixth subset 60). In some embodiments, without applying future value instruction ordering some of the instructions of the fourth subset 70 could not be reordered. For example, the seventh instruction 72 could not be placed before the production of the value of the object x included in the fifth instruction 52 or the sixth instruction 62 using traditional instruction ordering since a physical location is only allocated upon processing a definition or production of a value and not a consumption of a value.

Upon reordering the fourth subset 70 such that it immediately follows the first subset 35, the reference to the value of the object x in the seventh instruction 72 can be flagged as a future value object (as illustrated by $x_f$ in FIG. 7). Flagging the reference to the value of the object x can instruct the processor to allocate a physical location to the value of the object even though the processor has not previously encountered a definition or production of the value.

After reordering the instruction set 30 and flagging the reference to the value of the object x in the seventh instruction 72 as a future value object, the processor can continue processing instructions by processing control-independent instructions included in the fourth subset 70. In some embodiments, the instruction set 30 is reorganized such that enough control-independent instructions are moved or reordered to occupy or fill the instruction processing pipeline until the branch instruction included in the fourth instruction 46 is processed to determine one of the possible branch paths to process without stalling the instruction processing pipeline and decreasing the processing benefits it provides.

It should be understood, however, that processing the control-independent instructions (the fourth subset 70) with the processor can include fetching the instructions and holding some of the instructions in a reservation station. The processor can hold control-independent instructions if the instructions are data-dependent on instructions that have not been executed yet. In essence, however, a processor keeps the pipeline full since instructions are still being fetched at a maximum or optimizing rate.

In some embodiments, the processor is configured to predict a branch path and to continue fetching along the predicted branch path. For example, with respect to the instruction set 30, if the processor predicts that the first possible branch path is the likely path to be processed, the processor can fetch the second subset 50, including the fifth instruction 52, and one or more instructions included in the fourth subset 70. Alternatively, if the processor predicts that the second possible branch path is the likely path, the processor can fetch the sixth instruction 62 included in the third subset 60 and instructions included in the fourth subset 70.

In some embodiments, if the prediction of the processor is correct, the processor continues operating normally since the correct instructions have been processed. However, if the prediction of the processor is incorrect, the processor may have to restart or reload instructions from the correct path. During a restart, processing cycles (i.e., time) are wasted due to the cost of restarting or reloading the instruction pipeline as well as the fact that useful instructions that may have been processed in the meantime are discarded.

Using traditional instruction ordering, if the prediction of a processor is incorrect, the processor may be required to reprocess (including refetching) incorrect instructions. In some embodiments, even control-independent instructions, which would have been processed regardless of the branch path processed, are completely reprocessed in order to reestablish physical location allocations generated with a producer instruction and passed to a consumer instruction.

For example, given the example illustrated in FIG. 6, if the processor initially followed the first possible branch path including the fifth instruction 52, the processor may allocate a physical location for the value of the object x defined or produced with the fifth instruction 52 and an identifier of the physical location would have been associated with the reference to the value of the object x included in the seventh instruction 72. If the prediction is incorrect, however, instruction processing may be rolled back to process the second possible branch path. The second possible branch path includes the sixth instruction 62 and a new physical location may be allocated for the value of object x defined or produced with the sixth instruction 62, which would then also be associated with the value of the object x referenced in the seventh instruction 72. By rolling back processing, control-independent instructions are processed twice, and, therefore, the processing time of the instruction set 30 is increased.

Figure 8:
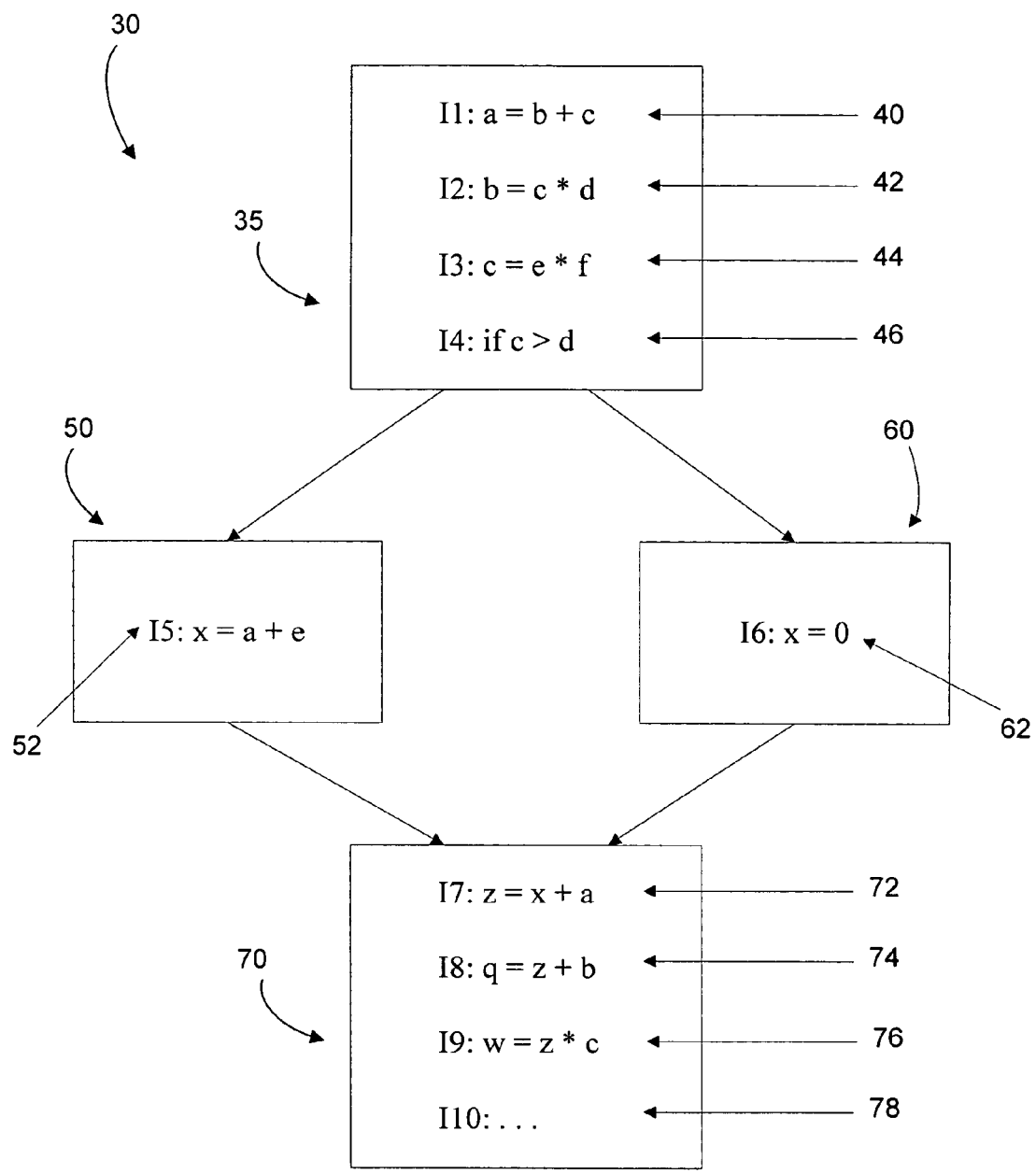
FIG. 8 illustrates another exemplary instruction set representing traditional instruction ordering.
Figure 9:
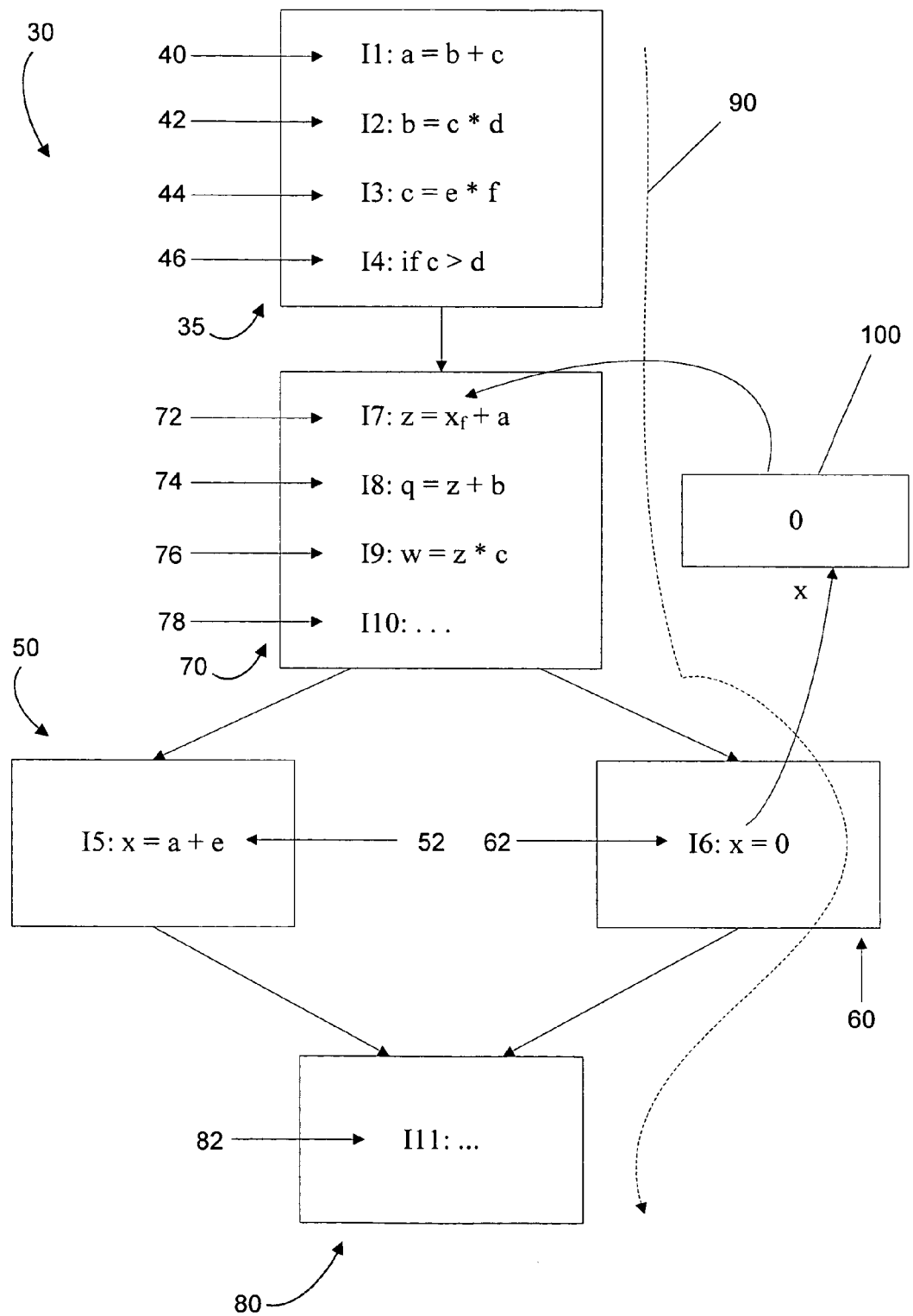
FIG. 9 illustrates the instruction set of FIG. 8 reordered using future value instruction ordering and a predicted branch path.

In contrast to the prediction fallbacks described above, incorporating future value instruction ordering with branch prediction can provide generally less risky or costly branch prediction. FIG. 8 illustrates the instruction set 30 representing traditional instruction ordering, and FIG. 9 illustrates the instruction set 30 reordered using future value instruction ordering, such that the fourth subset 70 immediately follows the first subset 35. As described for FIG. 7, reordering the instruction set 30 causes the object x referenced in the seventh instruction 72 to be flagged as a future value object ($x_f$) since the value of the object x will be produced in the "future."

In the example illustrated in FIG. 9, a processor processing the instruction set 30 may predict the second possible branch path (including the third subset 60 and the sixth instruction 62) as the likely branch path. Using the predicted path, the processor processes the instructions included in the first subset 35, the fourth subset 70, and the third subset 60. The processor also processes one or more instructions from a fifth subset 80, such as an eleventh instruction 82 labeled "I11." The dashed processing path 90 illustrates an exemplary processing path of the processor.

Following the processing path 90, the processor encounters the seventh instruction 72 included in the fourth subset 70 and, since the reference to the object x in the seventh instruction 72 is flagged as a future value object, the processor allocates a physical location for the value of the object x, such as a register 100. In some embodiments, the processor then holds the seventh instruction 72 in a reservation station (not shown) to wait until a value of the object x is available in the register 100.

While executing the processing path 90, the processor also fetches and executes the sixth instruction 62 included in the third subset 60. The sixth instruction 62 is a producer instruction that defines or produces a value of the object x. As illustrated in FIG. 9, upon processing the sixth instruction 62, a value (e.g., zero) can be stored to the register 100 and the stored value can then be available and used with the seventh instruction 72.

If the prediction of the processor is incorrect, however (i.e., the second subset 50 including the fifth instruction 52 is actually the determined branch path), the processor may execute the control-independent instructions included in the fourth subset 70 with incorrect values. For example, the seventh instruction 72 can execute the expression $z=x_f+a$ using the value (i.e., zero) produced with the incorrect sixth instruction 62.

As noted, in traditional instruction ordering, once an incorrect prediction is detected, the processor rolls back or reverses to process the correct instructions with correct values. When using certain embodiments of future value instruction ordering, however, the processor does not need to completely reprocess control-independent instructions and re-establish data dependence links. Rather, a physical location is allocated for the value of the object identifier x when the processor encounters the seventh instruction 72 that can be associated with any subsequent reference to the object x.

In some embodiments, the seventh instruction 72 (and any other instructions whose executed result depends on whether the prediction of the processor is correct) is purposefully held in the reservation station until the prediction of the processor is verified. By holding the speculative reordered instructions until a definitive branch direction is determined, the speculative reordered instructions do not have to be reprocessed (e.g., re-fetched). The prediction-dependent instructions can then be released once the values that the instructions consume are definite.

Figure 10:
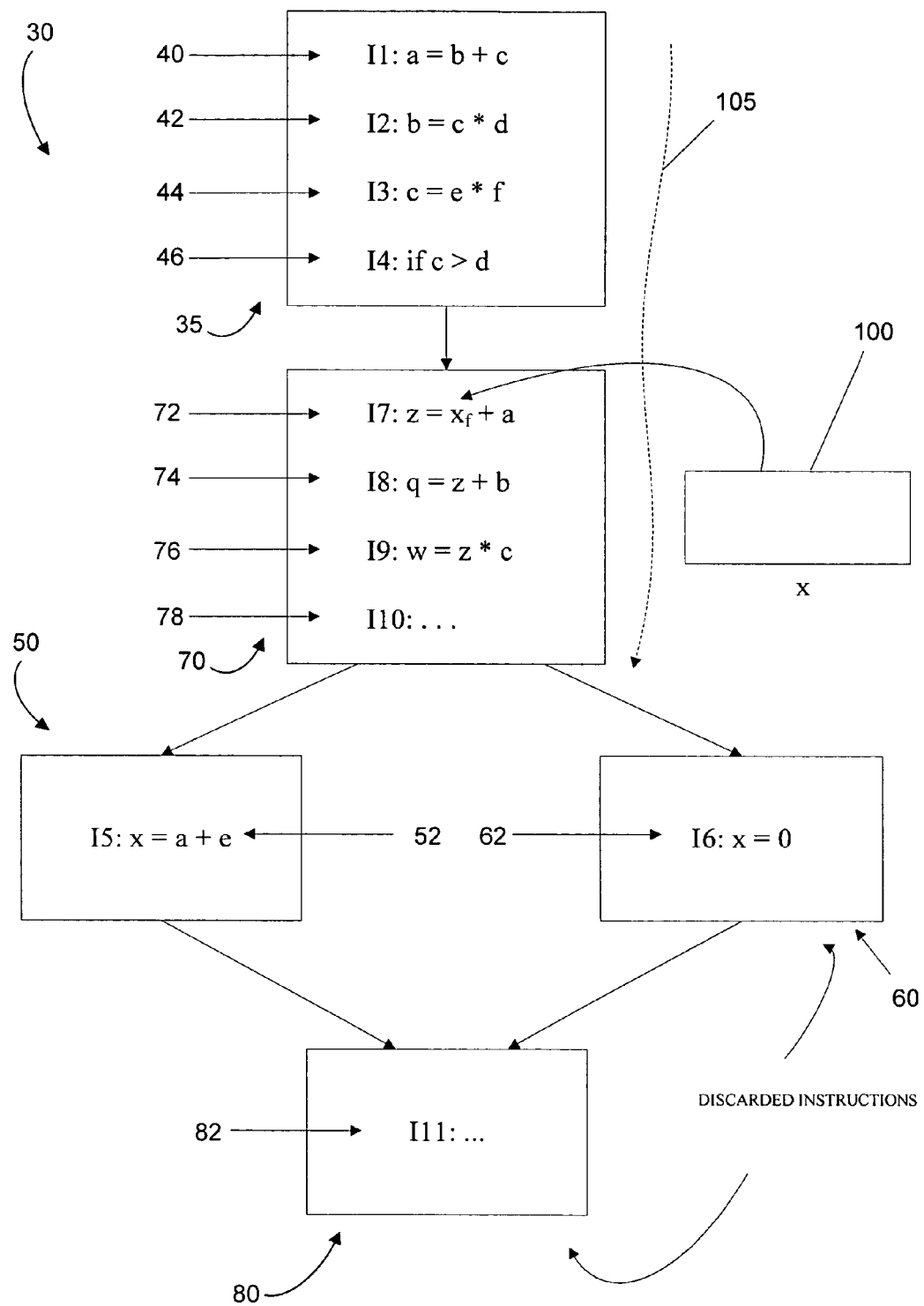
FIG. 10 illustrates the instruction set of FIG. 9 and a rolled-back processing path taken when a predicted branch path is incorrect.

In some embodiments, since the speculative reordered instructions are still being held, the processor is only required to roll back to where incorrect processing (i.e., executing) began. As illustrated in FIG. 10, a processing path 105 indicates the processing of the processor that is retained. The path 105 includes the instructions of the first subset 35 and the instructions of the fourth subset 70. In comparing the processing path 90 to the processing path 105, the processor rolled back or "erased" the processing of the sixth instruction 62 and the eleventh instruction 82. These instructions are labeled as discarded instructions since they were incorrectly and unnecessarily processed before the incorrect prediction was detected.

Figure 11:
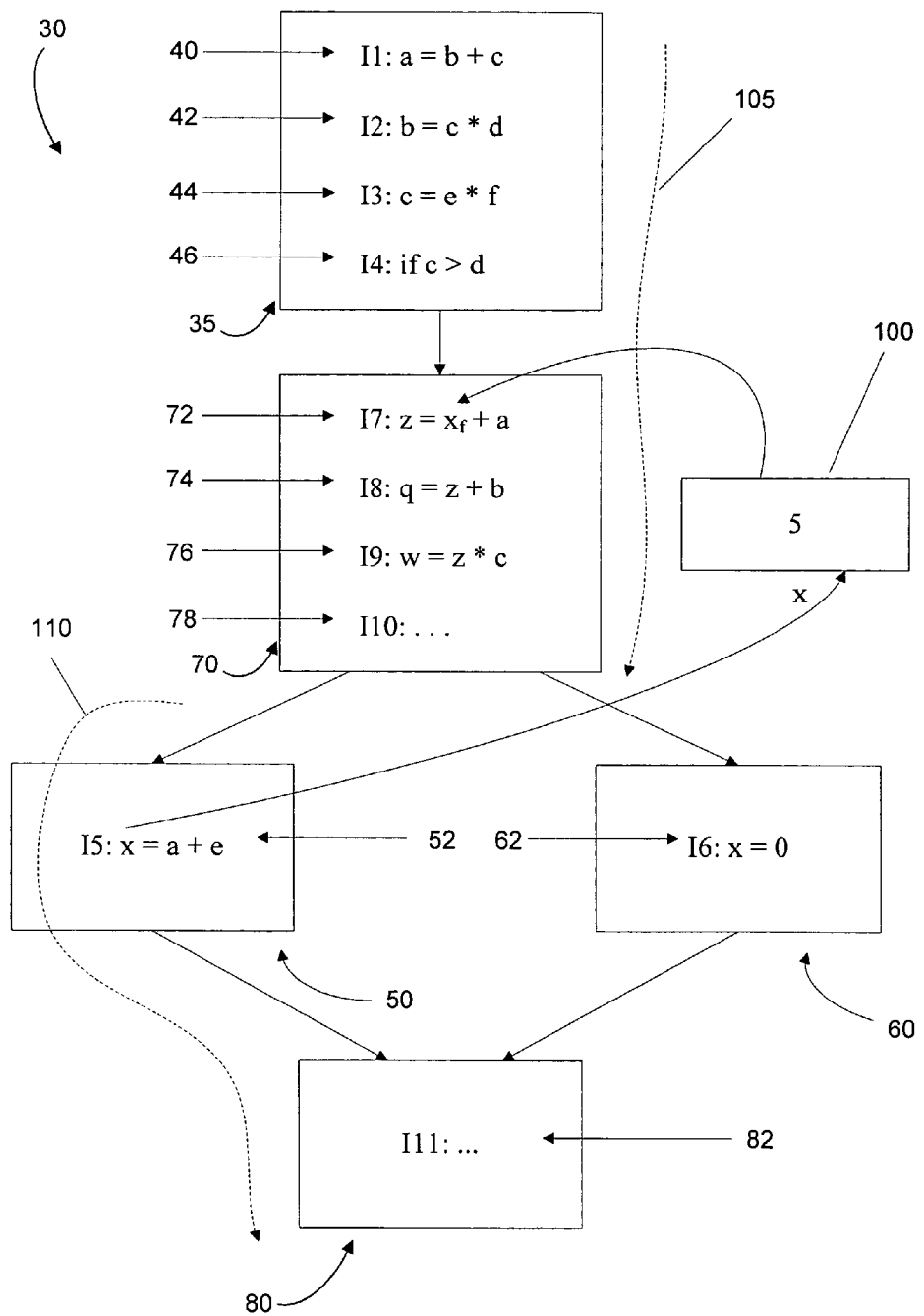
FIG. 11 illustrates the instruction set of FIG. 9 and a corrected processing path.
Figure 12:
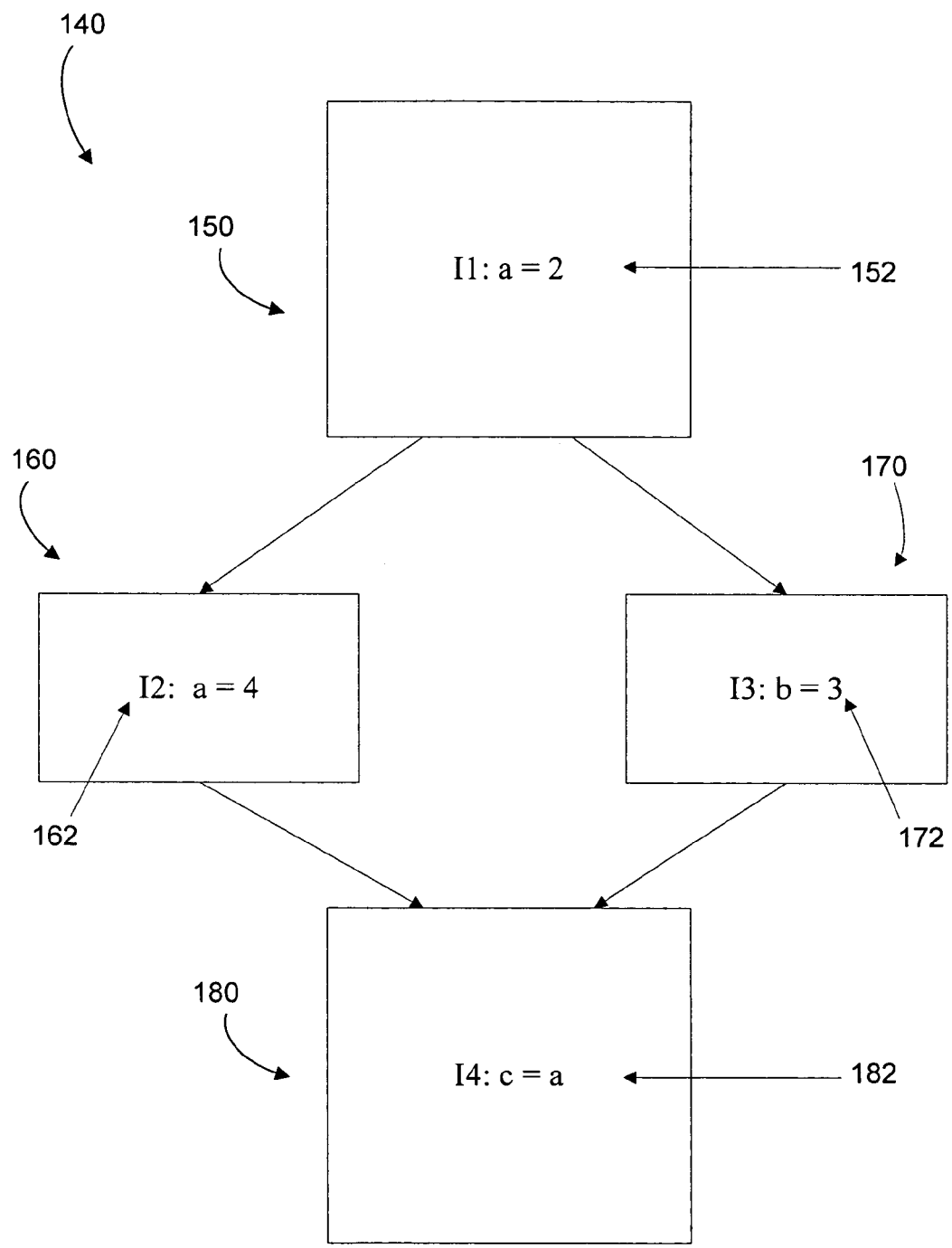
FIG. 12 illustrates anther exemplary instruction set including a first branch path and a second branch path.

FIG. 10 also illustrates that the register 100 is still allocated to the value x after the processor rolls back. This is so because the processing of the control-independent instructions included in the fourth subset 70 was not rolled back. As illustrated in FIG. 11, after rolling back, the processor begins processing along the correct branch path (processing path 110). The fifth instruction 52 is executed and a value (e.g., five) is stored in the register 100. The value stored in the register 100 can then be used to process the seventh instruction 72 and execute the expression $z=x_f+a$.

In some embodiments, consumer instructions may be reordered such that they are processed before corresponding producer instructions as long as at least one corresponding producer instruction is guaranteed to be processed in the "future." For example, the second subset 50 and the third subset 60 illustrated in FIGS. 6-9 represent possible branch paths that both include a producer instruction that produces a value for the object x. Since both possible branch paths include a producer instruction for the value of the object x, a producer instruction for a value of the object x will be encountered regardless of the determined branch path. Therefore, the seventh instruction 72 that consumes the value of the object x can be placed before the instructions of the second subset 50 and the third subset.

Figure 13:
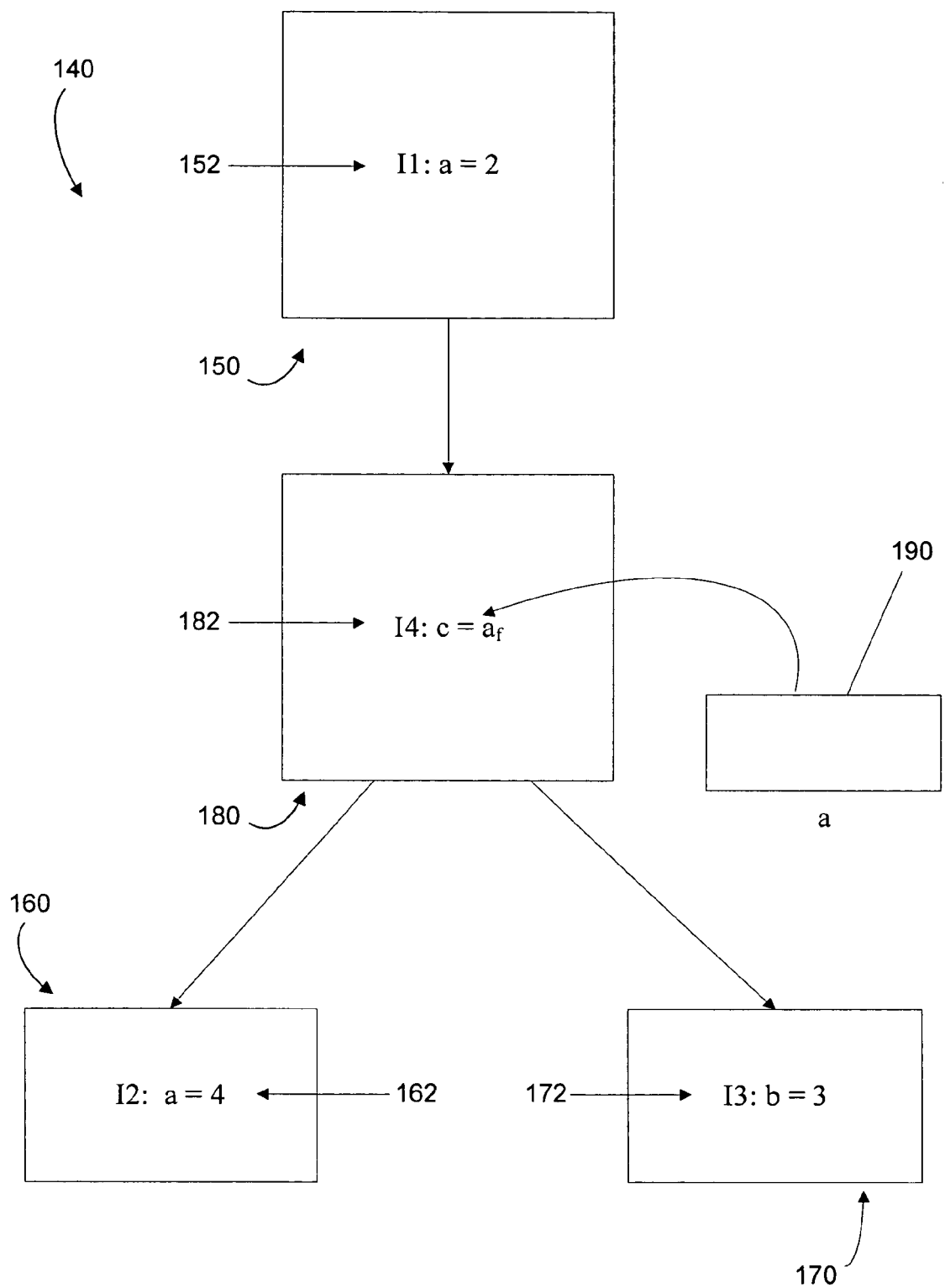
FIG. 13 illustrates the instruction set of FIG. 12 reordered using future value instruction ordering.

If, however, a producer instruction is not included in all possible branch paths, a consumer instruction can wait for a corresponding producer instruction that may never be encountered. FIG. 13 illustrates an instruction set 140. The instruction set 140 includes a pre-branch instruction subset 150 that includes an initial producer instruction 152 labeled "I1" that establishes an initial definition or production of a value of the object a. The instruction set 140 also includes a first-branch-path instruction subset 160 that includes a subsequent producer instruction 162 labeled "I2" that produces a subsequent value of the object a. The instruction set 140 also includes a second-branch-path instruction subset 170 that includes a producer instruction 172 labeled "I3" that defines a value of an object b but does not include a subsequent producer instruction producing a value of the object a.

The instruction set 140 further includes a post-branch instruction subset 180 that includes a consumer instruction 182 that consumes the value of the object a. If the first-branch-path instruction set 160 is processed, the consumer instruction 182 uses "4" as the value of the object a. However, if the second-branch-path instruction subset 170 is processed, the consumer instruction 182 uses the value of the object a as produced with the initial producer instruction 152.

Using future value instruction ordering, the post-branch instruction subset 180 can be reordered such that it immediately follows the pre-branch instruction subset 150, as illustrated in FIG. 13. Upon processing the reordered post-branch instruction set 180, a physical location (e.g., a register 190) can be allocated for a value of the object a flagged as a future value object. In some embodiments, the reference to the object a included in the initial producer instruction 152 and the reference to the future value object a included in the consumer instruction 182 are considered references to different objects. And, separate physical locations are allocated for the value of the object a and for the value of the future value object a. For example, as illustrated in FIG. 13, the value of the future value object a produced with the initial producer instruction (e.g., 2) is not stored in the register 190. Instead, the register 190 was allocated specifically for the future value object a.

Alternatively, the reference to the object a included in the initial producer instruction 152 and the reference to the future value object a included in the consumer instruction 182 can be considered references to the same object. In addition, the reference to the future value object a included in the consumer instruction can be associated with the physical location previously allocated for the object a with the initial producer instruction.

Figure 14:
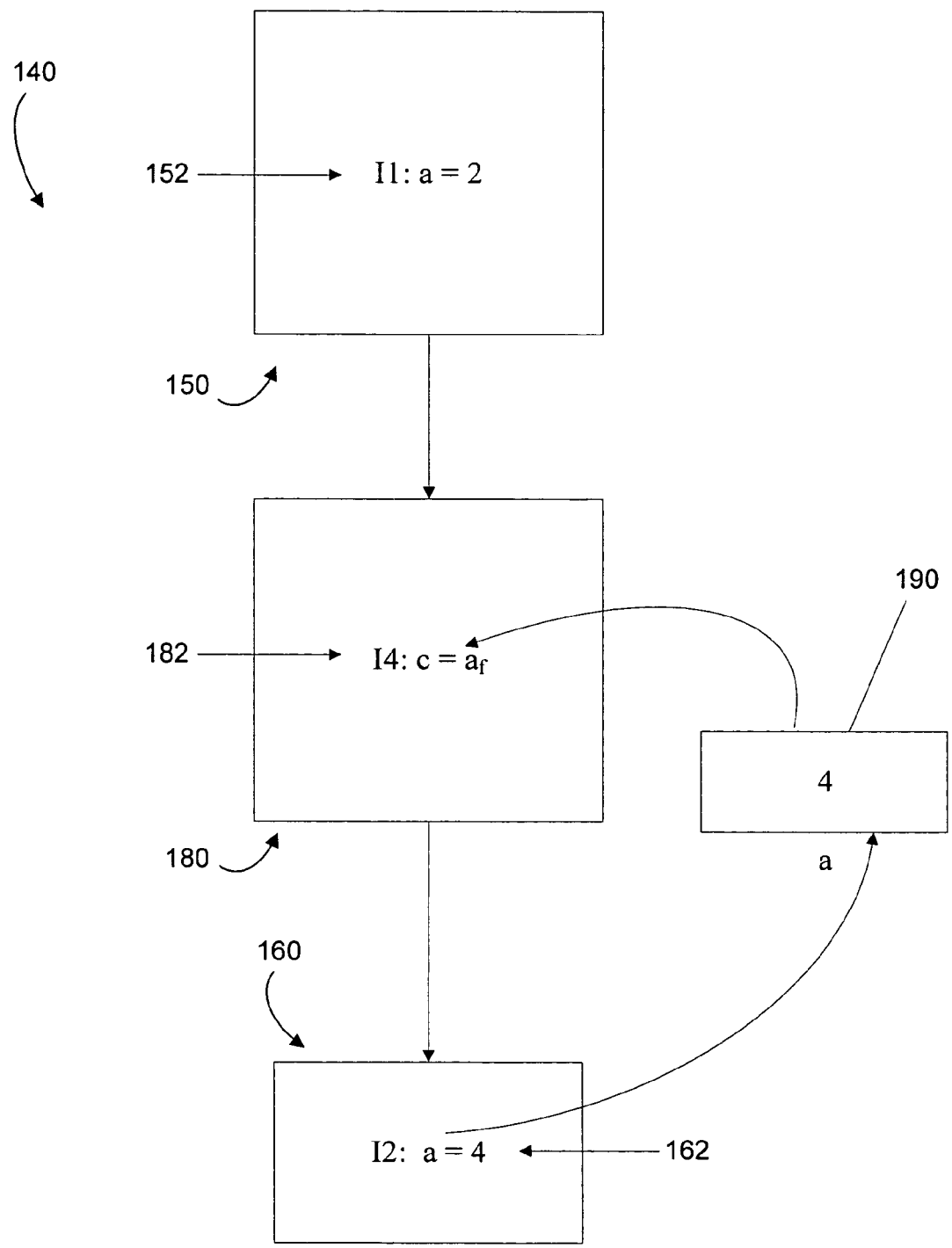
FIG. 14 illustrates exemplary processing of the instruction set of FIG. 13 including the first branch path.

If the instruction set 140 is reordered as illustrated in FIG. 13 and the first-branch-path instruction subset 160 is processed as the branch direction, the register 190 obtains the value produced with the subsequent producer instruction 162 (e.g., 4). As illustrated in FIG. 14, the value can then be used with the consumer instruction 182.

Figure 15:
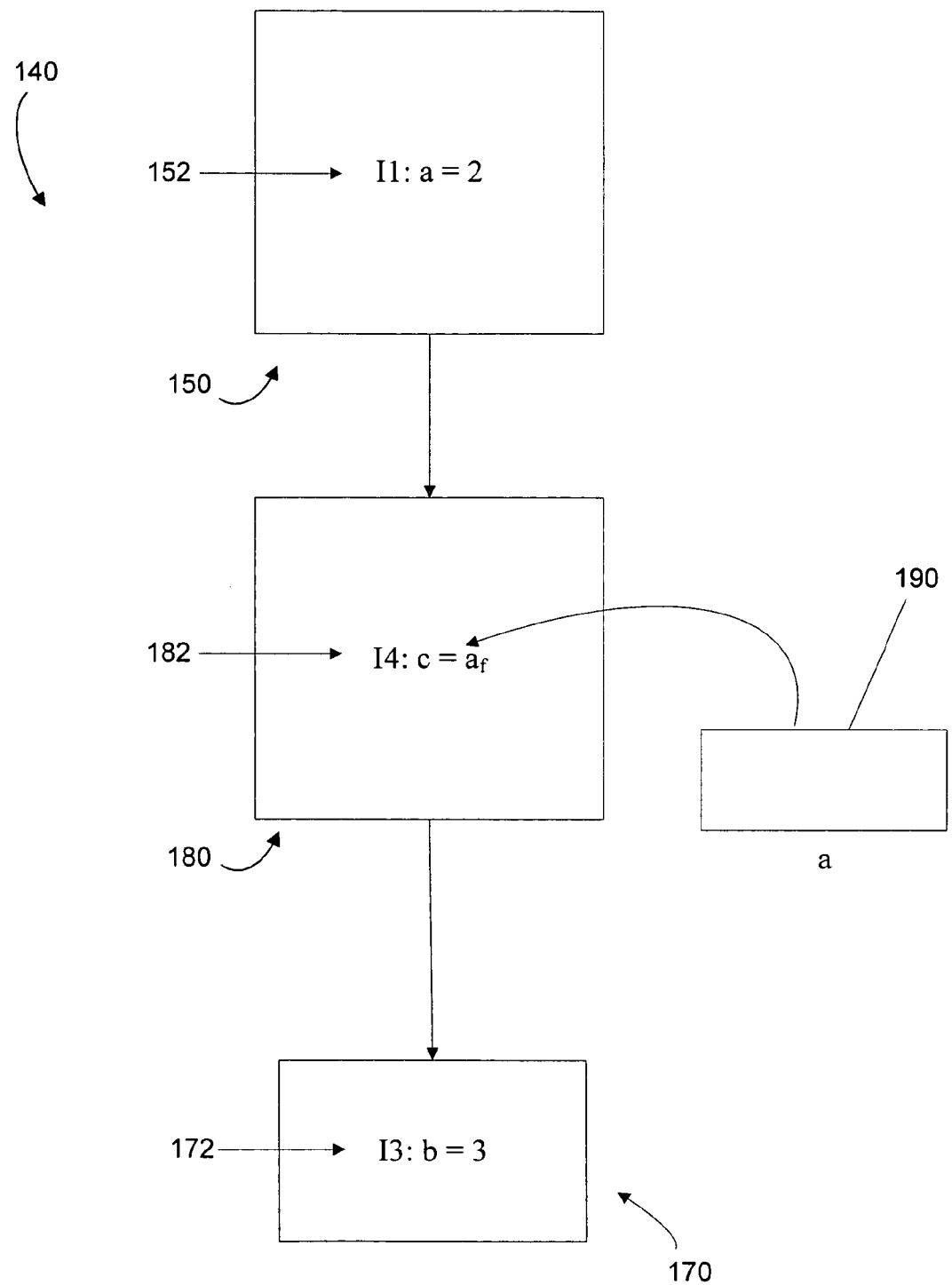
FIG. 15 illustrates exemplary processing of the instruction set of FIG. 13 including the second branch path.

Alternatively, if the second-branch-path instruction subset is processed, as illustrated in FIG. 15, the future value object $a_f$ referenced in the consumer instruction 182 may wait for a production of a value of the object a that is never encountered.

Figure 16:
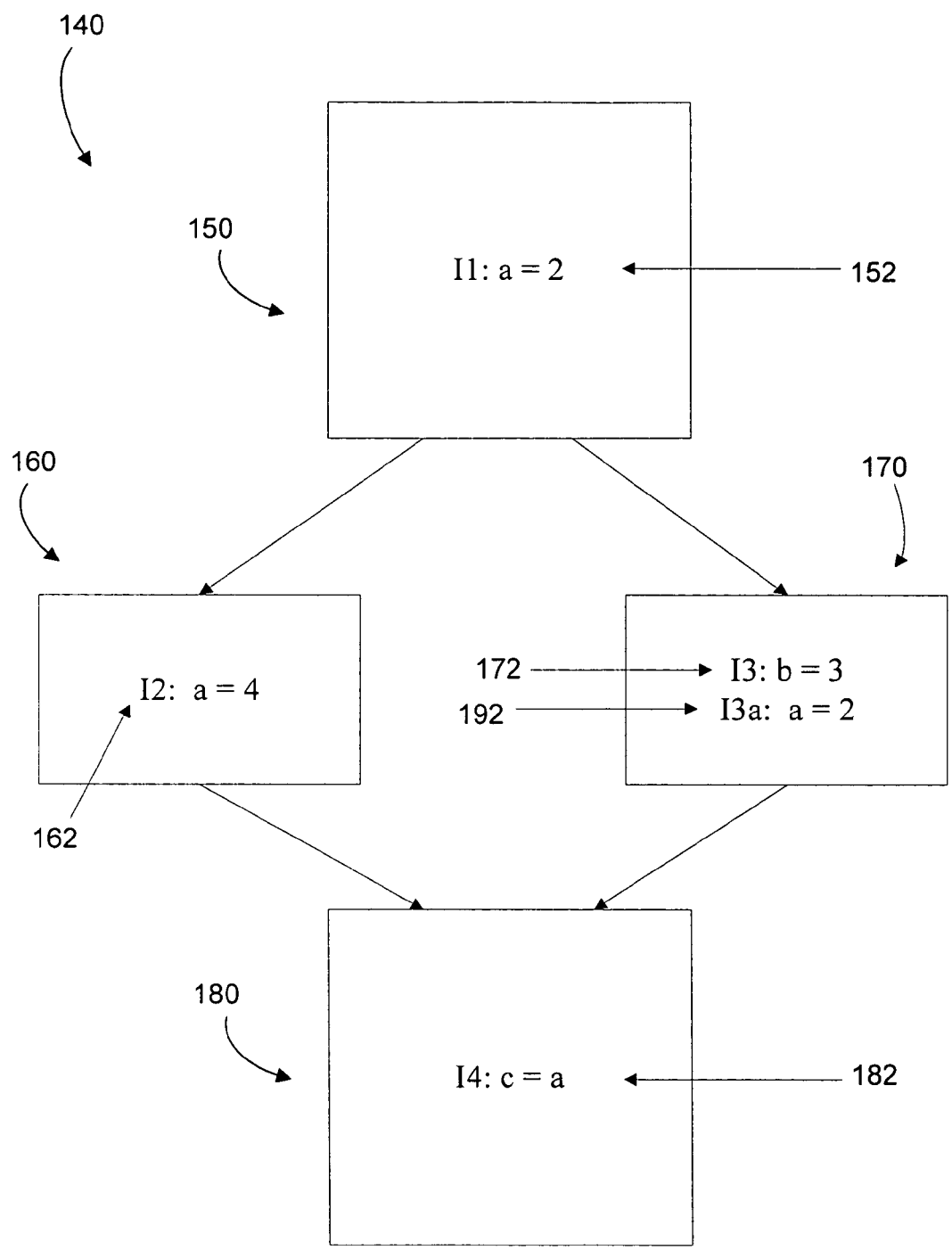
FIG. 16 illustrates the instruction set of FIG. 12 including a modified first branch path and a second branch path.

In some embodiments, to ensure that a producer instruction is processed regardless of the determined branch path, a subsequent producer instruction is added to a branch path that does not include a subsequent producer instruction. As illustrated in FIG. 16, a copy of the initial producer instruction (instruction 192 labeled "I3a") can be added to the second-branch path instruction subset 170. In some embodiments, a subsequent producer instruction is added to the branch path that sets the value of the future value object equal to the value of the object initially produced by the initial producer instruction 152, if the future value object is allocated a separate physical location as described above. In other embodiments, the initial producer instruction is moved to the branch path without a subsequent producer instruction using partial-dead-code elimination techniques.

Another issue that can arise from reordering instructions, is changing the order of memory load/store instructions. In some embodiments, processors employ dynamic memory disambiguation (using a mechanism such as a store set algorithm), and the only issue to consider when reordering memory instructions is detecting memory order violations. Once a memory order violation is detected, a memory dependence detector can prevent or restrict a reordered memory instruction from issuing early, since it is encountered first with a processor. In some embodiments, a block number is assigned to each instruction to correctly detect memory order violations for reordered instructions. After reordering the instructions, the memory load/store instructions retain their original block number, which designates a desired execution flow of the instructions regardless of how the instructions are encountered once reordered.

In certain embodiments, a processor is configured to reorder instructions using future value instruction ordering. In some embodiments, a processor is configured to reorder instructions using future value instruction ordering with a technique that is similar to predecoding. Predecoding allows a processor to determine or estimate the type of a fetched instruction. In some embodiments, predecoding is performed upon fetching an instruction or storing an instruction to an instruction cache of a processor. Predecoding is often used with processors performing instruction level parallelism to identify branch instructions, or other possibly conflicting instructions, in order to compensate for potential pipelining conflicts by fetching subsequent instructions out-of-order from the normal or initial instruction order. After identifying a potential pipelining conflict, the processor can reorder instructions using future value instruction ordering to accommodate potential pipelining conflicts without delaying or decreasing the output rate of the instruction pipeline.

The processor can also be configured to reorder instructions using future value instruction ordering when it experiences an instruction-cache miss, which indicates that the a subsequent instruction to process is not readily available. The processor can attempt to fill or load the pipeline with out-of-order instructions creating future value ordered instructions.

In addition, the processor can be configured to reorder instructions using future value instruction ordering during trace cache construction. A trace cache can be used to save instruction sequences processed with a processor such that the sequences can be refetched from the trace cache rather than from a separate memory or cache, which may take more time. In some embodiments, after processing a sequence of instructions including a branch instruction (and possibly experiencing processing delay due to branch path uncertainty), the processor reorders the sequence of instructions using future value instruction ordering such that subsequent processing of the same sequence of instructions can be performed with less processing delay.

In some embodiments, when a processor reorders instructions using future value instruction ordering using any of the above techniques, the processor may place a consumer instruction before a corresponding producer instruction and may flag objects referenced with the consumer instruction as future value objects. In some embodiments, a processor flags future value objects by associating a flag, such as a single bit, with an object identifier. A single bit future value object flag can be set to one to indicate future value object references and can be cleared or set to zero to indicate non-future value object references.

In addition to the various processor configurations discussed above, pre-processing instruction organizing applications and techniques, such as compilers, interpreters, and assemblers, can also order or reorder instructions using future value instruction ordering. For example, the processor can operate a pre-processing instruction organizing application (which may be implemented as an "instruction organizer" that includes software, hardware, or a combination thereof) to translate and/or reorganize an instruction set so that the processor can execute the instruction set. The instruction organizer can be configured to review a set of instructions, to determine potential reordering optimizations that can be performed, to reorder instructions, and to flag future value objects. In some embodiments, the instruction organizer indicates future value objects by setting a bit associated with an object identifier. For example, an instruction organizer can translate source or high-level instructions into to binary or machine-readable instructions and can associate a bit with each object identifier reference included in an instruction. The instruction organizer can set the bit to specify an object is a future value object and can clear the bit to specify an object is not a future value object. In some embodiments, the instruction organizer also includes an instruction generation application configured to allow a user to manually indicate future value objects based on a manual ordering of the instructions. A compiler can then translate the manually specified future value objects into future value objects flags or bits.

Figure 17:
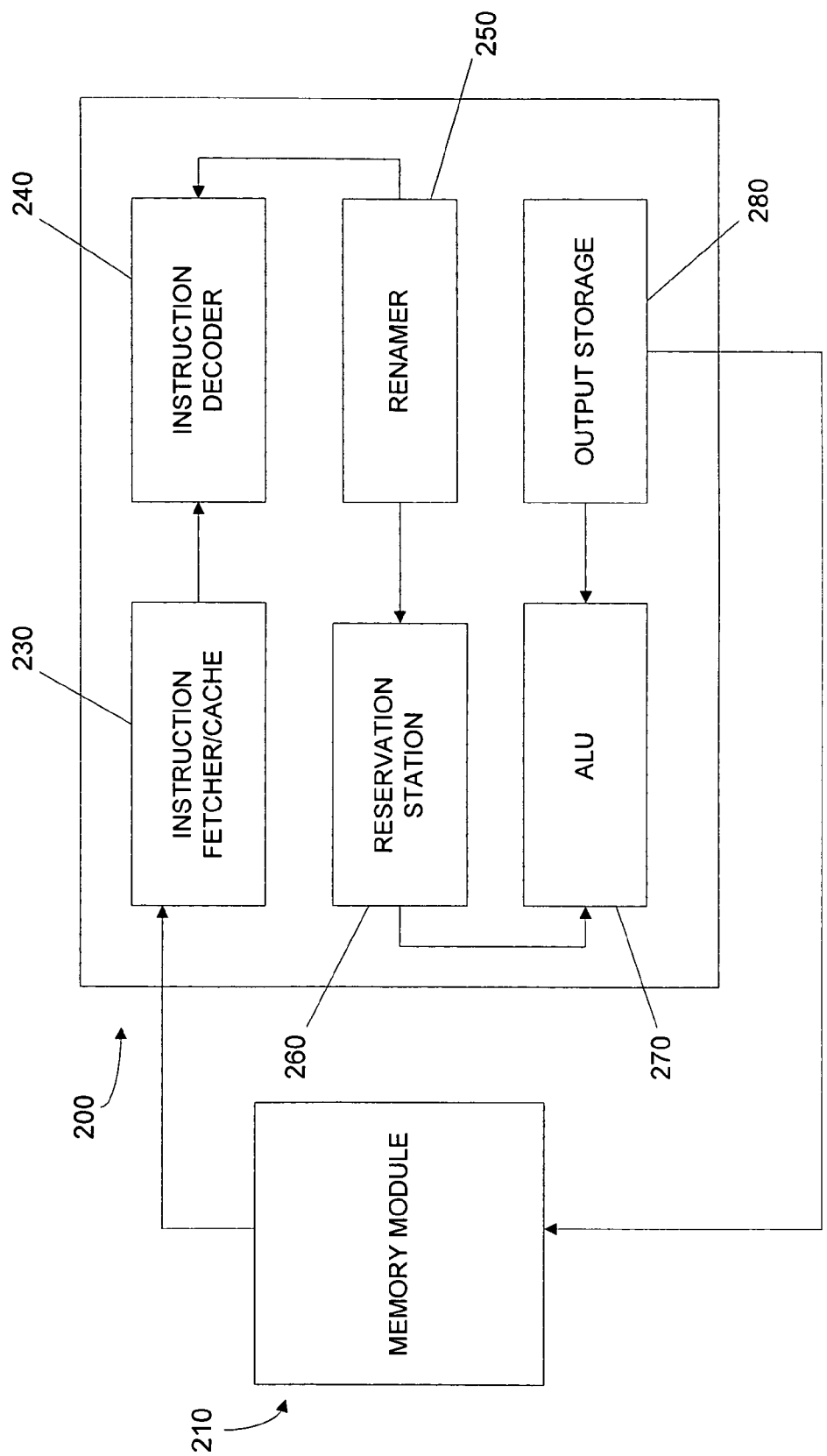
FIG. 17 is a schematic diagram of an exemplary processor and memory module.

In some embodiments, regardless of whether an object is flagged as a future value object with a processor or an instruction organizer, the processor uses a future value object flag or bit to determine how to process an instruction based on the value or state of the flag. FIG. 17 illustrates an exemplary processor 200 and memory module 210.

Figure 18:
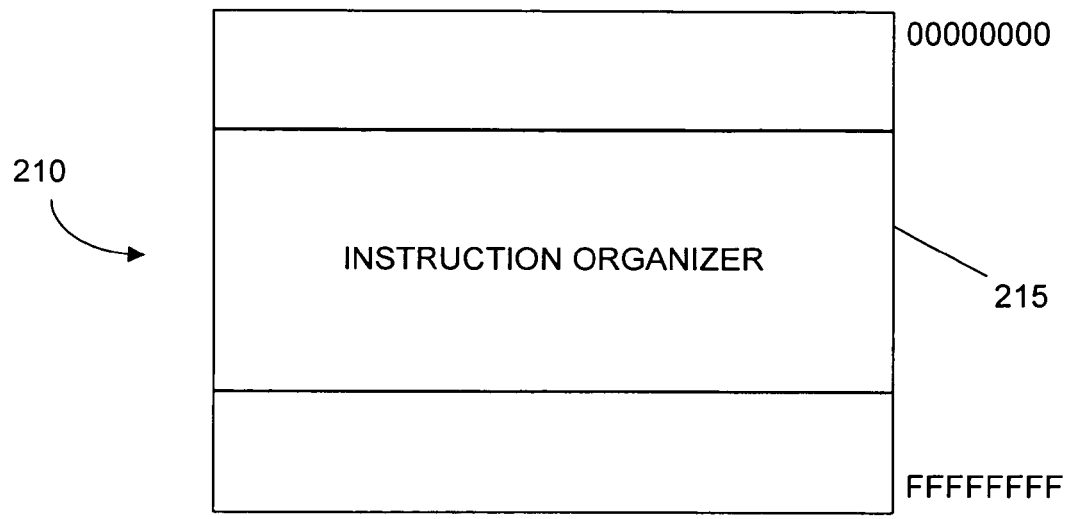
FIG. 18 represents a portion of the memory module of FIG. 17 that stores an instruction organizing application.
Figure 19:
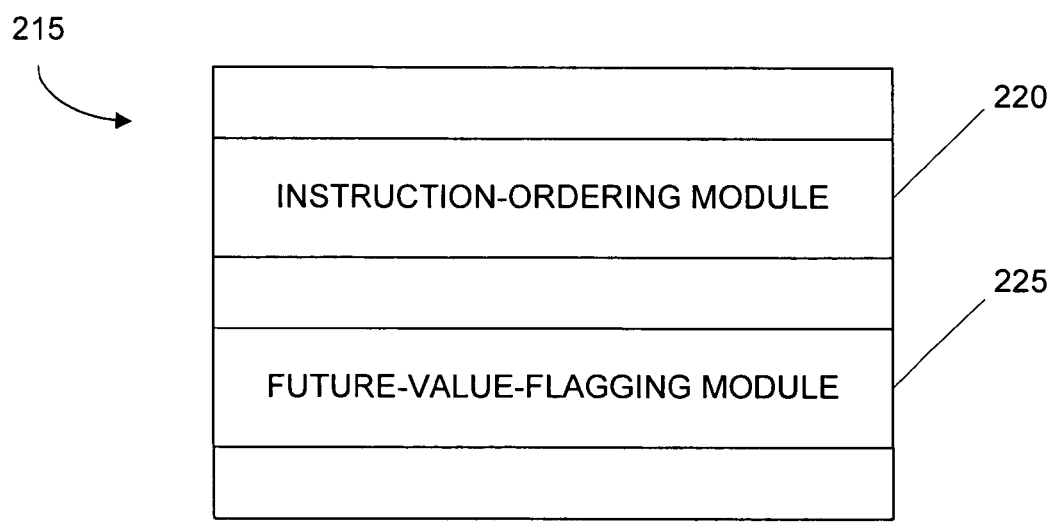
FIG. 19 illustrates exemplary modules of the instruction organizing application of FIG. 18.

The memory module 210 can include non-volatile memory such as one or more forms of ROM, one or more disk drives, RAM, other memory, or combinations of the foregoing. In some embodiments, the memory module 210 is configured to store an instruction organizer. FIG. 18 illustrates a portion of the memory module 210 including an instruction organizer 215. FIG. 19 illustrates that the instruction organizer 215 can include an instruction-ordering module 220 and a future-value-object-flagging module 225. The instruction-ordering module 220 can be configured to order instructions using future value instruction ordering. In some embodiments, the instruction-ordering module 220 is configured to identify control-dependent instructions and control-independent instructions to determine and select potential instructions to reorder. The instruction-ordering module 220 can also be configured to ensure that a producer instruction is guaranteed to be encountered for every consumer instruction referencing a future value object, and the instruction-ordering module 220 can also be configured to add or move instructions to guarantee that a producer instruction is encountered. The future-value-object-flagging module 225 can be configured to identify future value objects by flagging or marking future value objects.

As illustrated in FIG. 17, the processor 200 can include an instruction fetcher/cache 230, an instruction decoder 240, a renamer 250, a reservation station 260, an arithmetic logic unit ("ALU") 270, and an output or results storage 280. It should be understood that the processor 200 can include other components or modules in addition to and/or in place of the modules listed above. The functionality provided with the modules listed above can also be combined and distributed in various configurations.

The instruction fetcher/cache 230 fetches one or more instructions from the memory module 210. In some embodiments, a specific physical location or register stores a program counter that specifies one or more memory addresses of one or more instructions stored in the memory module 210 that should be fetched with the instruction fetcher/cache 230. The program counter can be adjusted (i.e., incremented) after the instruction fetcher/cache 230 fetches one or more instructions from the memory module 210. In some embodiments, the instruction fetcher/cache is also configured to predecode fetched instructions.

The instruction decoder 240 decodes one or more instructions. In some embodiments, the instruction decoder 240 determines a type of an instruction (e.g., a memory load instruction, an arithmetic instruction, a register manipulation instruction, a memory write instruction, etc), and prepares or initializes the processor 200 to process the instruction.

The renamer 250 associates or allocates a physical location or register with object identifiers referenced in instructions. In some embodiments, the renamer 250 is configured to obtain an object identifier, to allocate a physical location for a value of the object and to provide a physical location identifier for the allocated physical location for subsequent references to the object. In some embodiments, the renamer 250 uses the future value flags or bits, set with the processor 200 or the instruction organizer 215, to determine whether a physical location has already been allocated for a value of an object.

Figure 20:
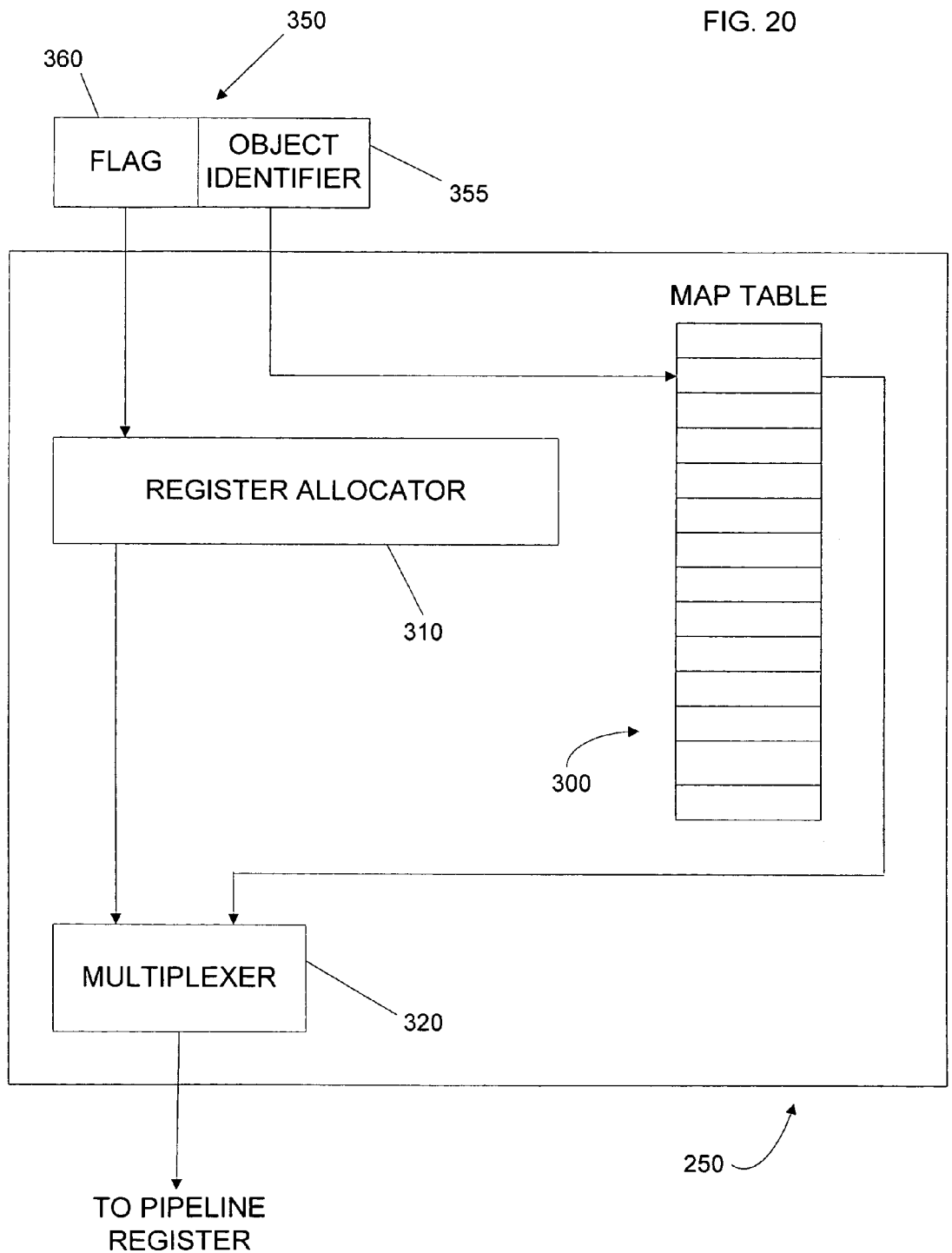
FIG. 20 is a schematic diagram of an exemplary renamer included in the processor of FIG. 17.

FIG. 20 illustrates exemplary components of the renamer 250. The renamer 250 includes a map table 300, a physical location or register allocator 310, and a multiplexer 320. The map table 300 can be configured to store physical location associations. For example, if a physical location or register identified as R27 is allocated to a value for an object a, the map table 300 can store an association between object a and register R27. Given one part of a physical location association, the map table 300 can be configured to provide the other part. For example, if the renamer 250 obtains an instruction with a reference to object a, the map table 300 provides the physical location identifier R27 that identifies the physical location associated with the object a. Subsequent references to the object a can use the physical location identifier provided from the map table 300 to determine where a value should be stored or consumed.

In some embodiments, the map table 300 stores one half of the physical location associations. For example, the map table 300 can store physical location identifiers and the associated object identifiers can be used as an index or hash into the map table. In some embodiments, the renamer uses characteristics of an object identifier to determine a specific entry or location of the map table 300 where an associated physical location identifier, if available, would be stored.

The register allocator 310 can be configured to allocate a physical location (e.g., a register) for a value of an object. In some embodiments, the register allocator 310 allocates a physical location for a value of an object not referenced with a previous instruction processed with the processor 200. The register allocator 310 can also be configured to store physical location identifiers to the map table to specify allocated physical locations. As described above, the register allocator 310 may use characteristics of an object identifier to determine where to store associated physical location identifiers.

In some embodiments, the multiplexer 320 is configured to obtain associated physical location identifiers from the map table 300 and the register allocator 310. The multiplexer 320 can be configured to transmit or provide the associated physical location identifiers obtained from the map table 300 and the register allocator 310 to a pipeline register. A pipeline register may be used to replace or reroute object identifiers included in instructions to physical locations of the processor 200. In some embodiments, the multiplexer 320 is configured to transmit either the physical location identifier provided from the map table 300 or the physical location identifier provided from the register allocator 310.

In some embodiments, the renamer 250 obtains an instruction 350 as input. The instruction 350 can include an object identifier 355 and a future-value-object flag or bit 360. As described above, the map table 300 can obtain the object identifier 355 and can use the identifier 355 to look up or determine an associated physical location identifier. Upon determining or locating an associated physical location identifier, the map table 300 forwards the associated physical location identifier to the multiplexer 320.

The register allocator 310 can obtain the future value object flag 360 in addition to the object identifier 355, and, in some embodiments, the register allocator 310 uses the future value object flag 360 to determine whether a physical location should be allocated. Generally, the register allocator 310 allocates a new physical location or register if the future value object flag 360 is set. Otherwise, no memory is allocated.

In some embodiments, the future value object flag 360 indicates a new future value object definition, regardless of whether the instruction 350 is a producer instruction or a consumer instruction of the object identified with the object identifier 355. Therefore, the object requires a new and separate physical location to store a value.

If the future value object flag 360 is set, the register allocator 310 reserves or allocates a register and updates the map table 300 with a physical location identifier that associates the newly-allocated physical location with the object identifier 355. In some embodiments, the register allocator 310 uses the object identifier 355 to determine how or where to store an associated physical location identifier to the map table 300. The register allocator 310 can also be configured to forward an identifier for the allocated physical location to the multiplexer 320.

If the future value object flag 360 is not set, the register allocator 310 does not allocate a physical location. Further, although not required, the register allocator 310 can forward an invalid or a specially designated physical location identifier to the multiplexer 320 indicating that a physical location was not allocated.

As described above, the multiplexer 320 can be configured to obtain physical location identifiers from the map table 300 and the register allocator 310. In some embodiments, if the register allocator 310 allocates a physical location for a value of an object, the newly-allocated physical location takes precedence over a previously-allocated physical location. For example, if the multiplexer 320 obtains a physical location identifier from the register allocator 310 and from the map table 300, the multiplexer 320 forwards the physical location identifier obtained from the register allocator 310 to a pipeline register and disregards the previously-allocated physical location identifier obtained from the map table 300. Using this technique, a reference to an object flagged as a future value object will be allocated a physical location and subsequent references to the object that are not flagged as a future value objects will be renamed or associated with the previously-allocated physical location as stored in the map table 300. For example, upon encountering an instruction including a reference to object a flagged as a future value object, the register allocator 310 allocates a physical location for a value of the object a and stores an identifier to the allocated physical location to the map table 300. Subsequent instructions, however, encountered with the renamer 250 that include a reference the object a not flagged as a future value object are not allocated new or separate physical locations. Instead, they are renamed with the identifier for the previously-allocated physical location stored in the map table 300.

It should be understood that the renamer 250 can be configured to obtain multiple object identifier and future value object flag pairs included in a single instruction. The register allocator 210 and map table 200 can be configured to provide physical location identifiers for each object identifier/future value object flag pair and provide the physical location identifiers to the multiplexer 320. The renamer 250 can also include multiple mutliplexers, and each mutliplexer can be configured to receive physical location identifiers associated with one object identifier/future value object flag pair.

Returning to FIG. 17, the reservation station 260 can be configured to hold instructions until they are scheduled for execution. The reservation station 260 can include a buffer that stores instructions until they can be released and executed. As described above, the instructions held in the reservation station 260 can include a tag that corresponds to a dependency (e.g., a physical location or register, a resource, etc.) that an instruction is waiting on. Instructions held with the reservation station 260 can be released once their dependencies (e.g., registers) are resolved or available. The reservation station 260 can also temporarily hold instructions without dependencies that will be released for execution once the processor 200 is ready to execute them.

The ALU 270 can be configured to obtain instructions from the reservation station 260 and execute them. Executing instructions can include performing mathematical processes, shifting or transferring values stored in physical locations, writing or loading values from the memory module 210, and the like.

In some embodiments, the output storage 280 temporarily stores or caches the results of executing an instruction with the ALU 270. The output storage 280 can act as a buffer for execution results. The execution results can be transferred from the output storage 280 to a physical location of the processor 20 or to the memory module 210.

Figure 21:
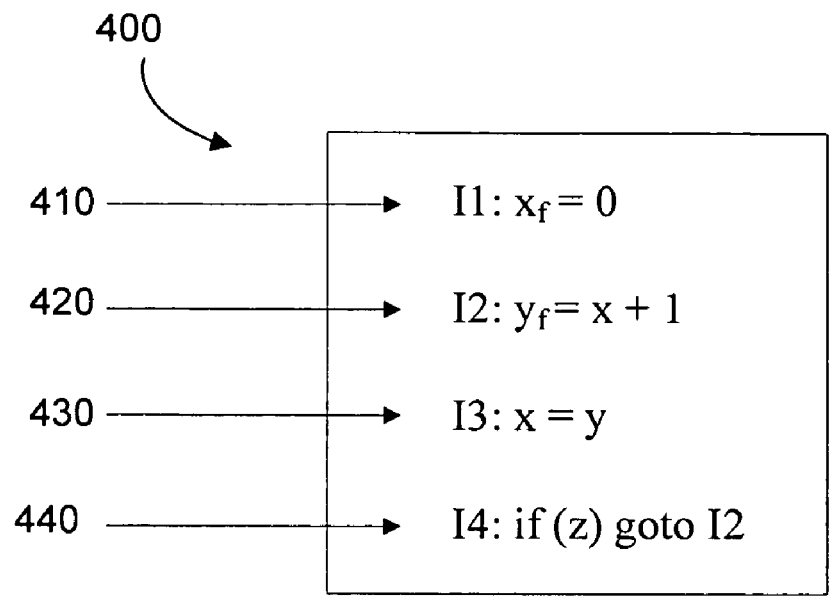
FIG. 21 illustrates an exemplary instruction set including a loop.

In some embodiments, the concept of processing instructions that consume a value of an object before processing an instruction that defines the value of the object can also be applied to processing loops or repeated instructions. Loops can include instructions that can be processed multiple times depending on the processing of a branch instruction. FIG. 21 illustrates an instruction set 400. The instruction set 400 includes a pre-loop instruction 410 (labeled "I1"), two loop instructions 420 and 430 (labeled "I2" and "I3" respectively), and a branch instruction 440. The branch instruction 440 can create a backward branch path such that the two loop instructions 420 and 430 and branch instruction 440 can be reprocessed.

Loop instructions can be represented as recursive instruction/predicate pairs {I, P}, indicating that the processing of the instruction I is guarded with the predicate P. In some embodiments, the predicate P includes a conditional statement that evaluates to one of two possible states—"TRUE" or "FALSE"—and the instruction I can be reprocessed (i.e., executed) until the predicate P evaluates to "FALSE." In some embodiments, the predicate P is considered a future value object since the value of the predicate is defined in the "future" at the bottom or end of the loop.

Figure 22:
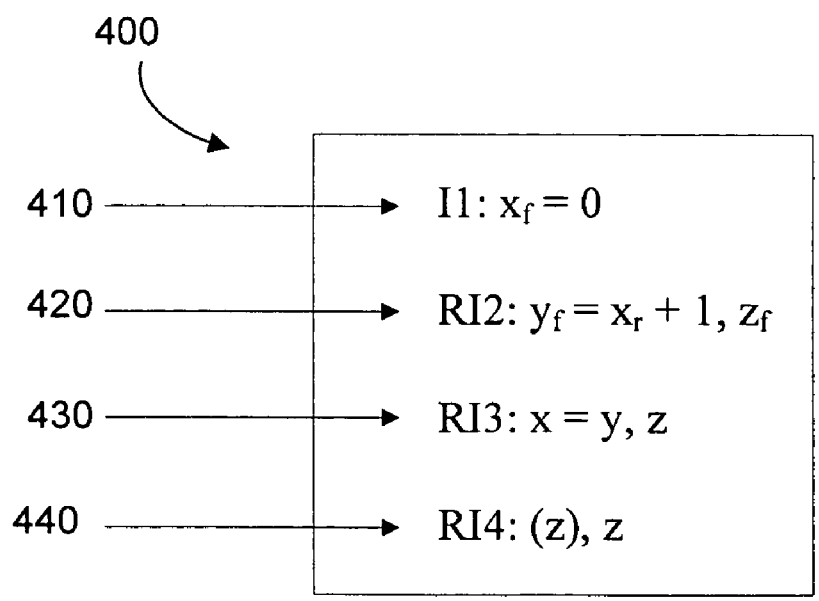
FIG. 22 illustrates the instruction set of FIG. 21 represented with recursive instructions.

With respect to the instruction set 400 illustrated in FIG. 21, the predicate guarding the reprocessing of the two loop instructions 420 and 430 is defined with the branch instruction 440. The branch instruction 440 includes the conditional statement if (z) where the object identifier z can reference a Boolean object that has a value equal to "TRUE" or "FALSE." In some embodiments, representing loop instructions as predicate-guarded recursive instructions allows loop instructions to be processed as a single sequence of instructions. FIG. 22 illustrates the instruction set 400 with the loop instructions 420 and 430 and the branch instruction 440 represented as predicate-guarded instructions.

In some embodiments, future value object concepts are applied to recursive instructions by marking an object that obtains another value throughout the processing of the loop as a recursive future value object. As illustrated in FIG. 22, the reference to object x consumed with the loop instruction 420 is flagged as a recursive future value object (illustrated $x_r$) since a new value for the object x is produced with the subsequent loop instruction 430. Similar to how flagging future value objects allows a consumer instruction to be processed (e.g., fetched and held in a reservation station) before a corresponding producer instruction, flagging future value objects in recursive instructions allows future iterations of consumer recursive instructions to be processed (e.g., fetched and held in a reservation station) before future iterations of producer recursive instructions.

Recursive future value objects can be identified using flags. In some embodiments, two flags are used to identity and distinguish future value objects from recursive future value objects. One flag designates whether the object is a future value object (meaning that value of an object will be defined in the future), and the other flag designates whether the object is a recursive future value object (meaning that another value of the object will be defined in the future). In some embodiments, an object may be identified as both a future value object and a recursive future value object. As illustrated in FIG. 22, the object x is flagged as a future value in the pre-loop instruction 410 (illustrated $x_f$) indicating that a value of object x will be defined in the future (i.e., with the processing of the pre-loop instruction 410). The object y reference and the object z reference included in the first loop instruction 420 are also flagged as a future value objects (illustrated $y_f$ and $z_f$ respectively).

The reference to object x included in the loop instruction 420 is flagged as a recursive future value (illustrated $x_r$) indicating that another value of object x will be defined in the future.

FIGS. 23-26 illustrates exemplary processing states of a processor encountering or processing the instruction set 400. In some embodiments, the processing states represent states of the processor 200 while processing the instruction set 400. In order to accommodate recursive future values objects the renamer 250 is configured to receive two flags for each object identifier included in an instruction. As described above, if a future-value-object flag is set for an object identifier, the renamer 250 allocates a physical location for a value of the object that will be associated with the object identifier of the current instruction and matching object identifiers included in subsequent instructions. The renamer 250 can also be configured to allocate a physical location for a value of the object if a recursive-future-value flag is set. The physical location allocated with the renamer 250 for the recursive-future-value flag, however, will only be associated with matching object identifiers included in subsequent instructions, and will not be associated with the current object identifier in the current instruction. In some embodiments, the register allocator 310 does not forward a physical location identifier to the multiplexer 320 upon allocating a physical location for a recursive future value object. Instead, the allocator 310, updates the map table 300 with the allocated physical location. By not forwarding the new physical allocation to the multiplexer 320, the current reference to the recursive future value object is associated with the identifier for the previously-allocated physical location stored in the map table 300. However, since the register allocator 310 updates the map table 300, subsequent references to the object identifier are associated with the newly-allocated physical location.

In some embodiments, the processor 200 is configured to release instructions from the reservation station 260 for execution when any data dependencies are eliminated. The processor 200 can also be configured to release instructions from the reservation station when a predicate value associated with an instruction is set to "TRUE." The processor 200 can further be configured to generate a copy of an instruction and leave or store the copy of the instruction in the reservation station 260 upon releasing a predicate-guarded recursive instruction from the reservation station 260. Furthermore, the processor 200 can be configured to remove or eliminate a predicate-guarded recursive instruction from the reservation station 260 if the predicate is set to "FALSE."

Figure 23:
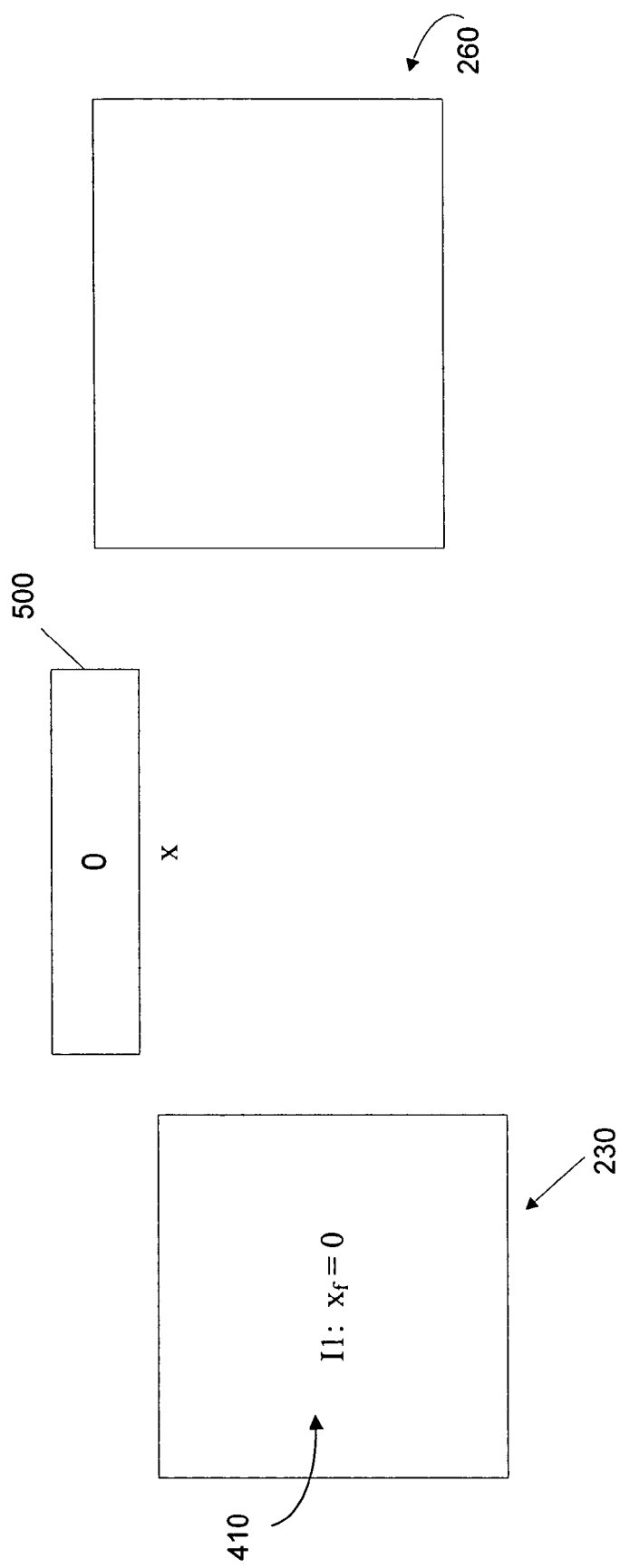
FIGS. 23-27 illustrate exemplary processing states of a processor executing the instruction set of FIG. 22.

FIG. 23 illustrates a processing state of the processor 200 after processing the pre-loop instruction 410. The instruction fetcher/cache 230 fetches the pre-loop instruction 410. Since the object x included in the pre-loop instruction 410 is flagged as a future value object, the renamer 250 allocates a physical location 500 for a value of the object x. The pre-loop instruction 410 is then forwarded to the reservation station 260 where the instruction 410 is released for execution if it does not contain any dependencies of other instructions. The instruction 410 is executed with the ALU 270 and a value (e.g., zero) is stored in the register 500. As illustrated in FIG. 23, after processing the pre-loop instruction 410, object x was allocated the register 500 and a value was stored to the register 500. In some embodiments, the reservation station 260 does not contain any other instructions.

Figure 24:
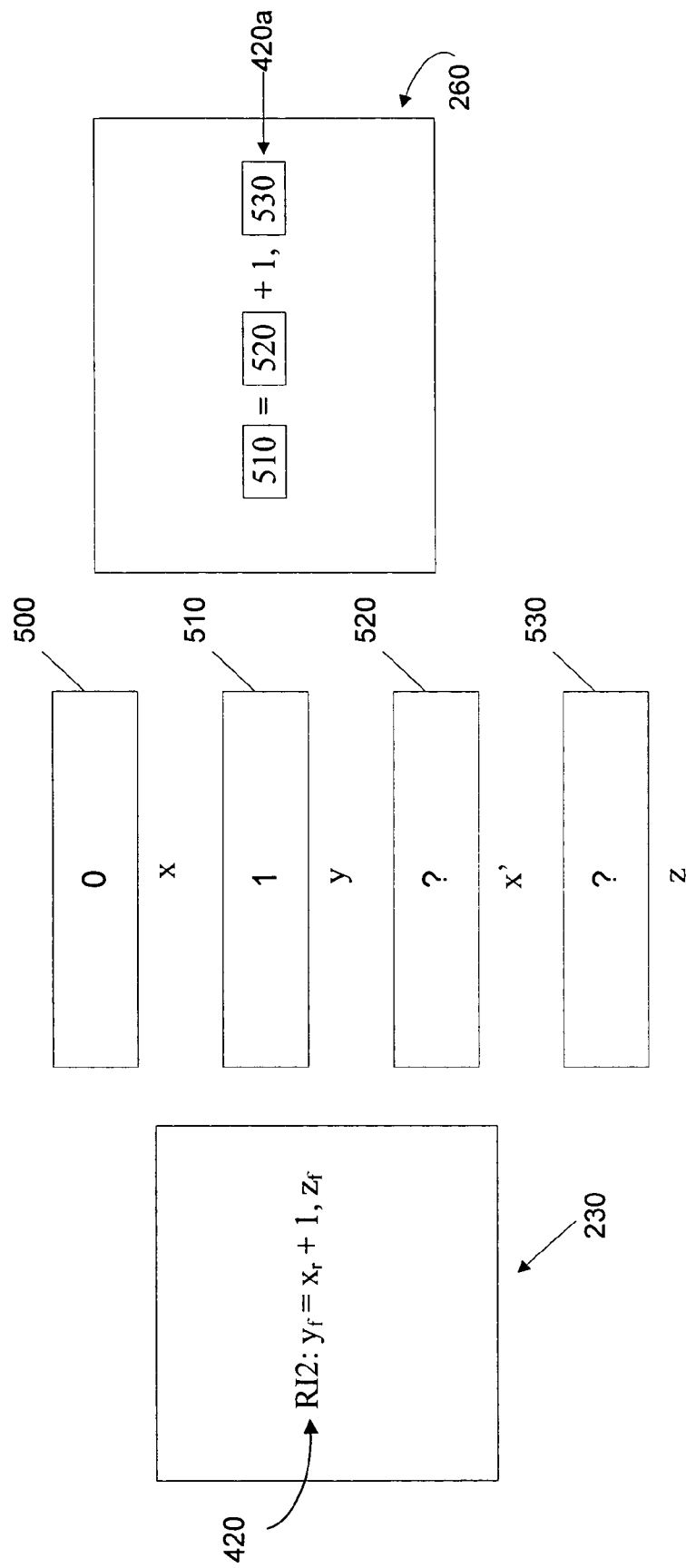

FIG. 24 illustrates a processing state of the processor 200 after processing the first loop instruction 420. The instruction fetcher/cache 230 fetches the loop instruction 420, and the renamer 250 obtains the loop instruction 420. The loop instruction 420 includes three object identifiers. The first object identifier for an object y is flagged as a future value object and so the renamer 250 allocates a physical location 510 for a value of the object y. The second object identifier included in the loop instruction 420 identifies an object x flagged as a recursive future value object. As described above, the renamer 250 can be configured to allocate a physical location for a recursive future value object that will be used or associated with subsequent references to the object x, but will not be associated with the current reference to the object x. Therefore, the renamer 250 allocates a physical location 520 for a value of the object x (illustrated as x' in FIG. 24).

The first loop instruction also includes an object identifier for the object z, which represents the predicate guarding the loop instruction 420. The reference to the object z is flagged as a future value object since a value of the object z will be defined in the future with the branch instruction 440 (rewritten as a predicate producer instruction). Since the object z is flagged as a future value object, the renamer 250 allocates a physical location 530 for a value of the object z.

After the renaming process is complete, the loop instruction 420 is forwarded to the reservation station 260, and, since the instruction 420 represents the initial iteration of the loop and as such the predicate does not yet apply to the instruction, the loop instruction 420 is released for execution. The ALU 270 executes the loop instruction 420, and the register 510, which is associated with the object y, obtains a value (i.e., 1). In some embodiments, the processor 200 signals the availability of the value stored in the physical location 510.

Upon releasing the loop instruction 420 from the reservation station 260, however, a copy of the loop instruction 420 (hereinafter "copy instruction 420a"), including the predicate, remains the in reservation station 260. It should be noted that since the copy instruction 420a represents a subsequent or future instruction, the reference to object x in the copy of loop instruction 420 is associated with the physical location 520 allocated for "future" references to the object x.

The copy instruction 420a can remain in the reservation station since a value has not been signaled as available for the object x or the object z. In some embodiments, the object z, when available, is also required to be set to "TRUE" in order for the copy instruction 420a to be released for execution.

Figure 25:
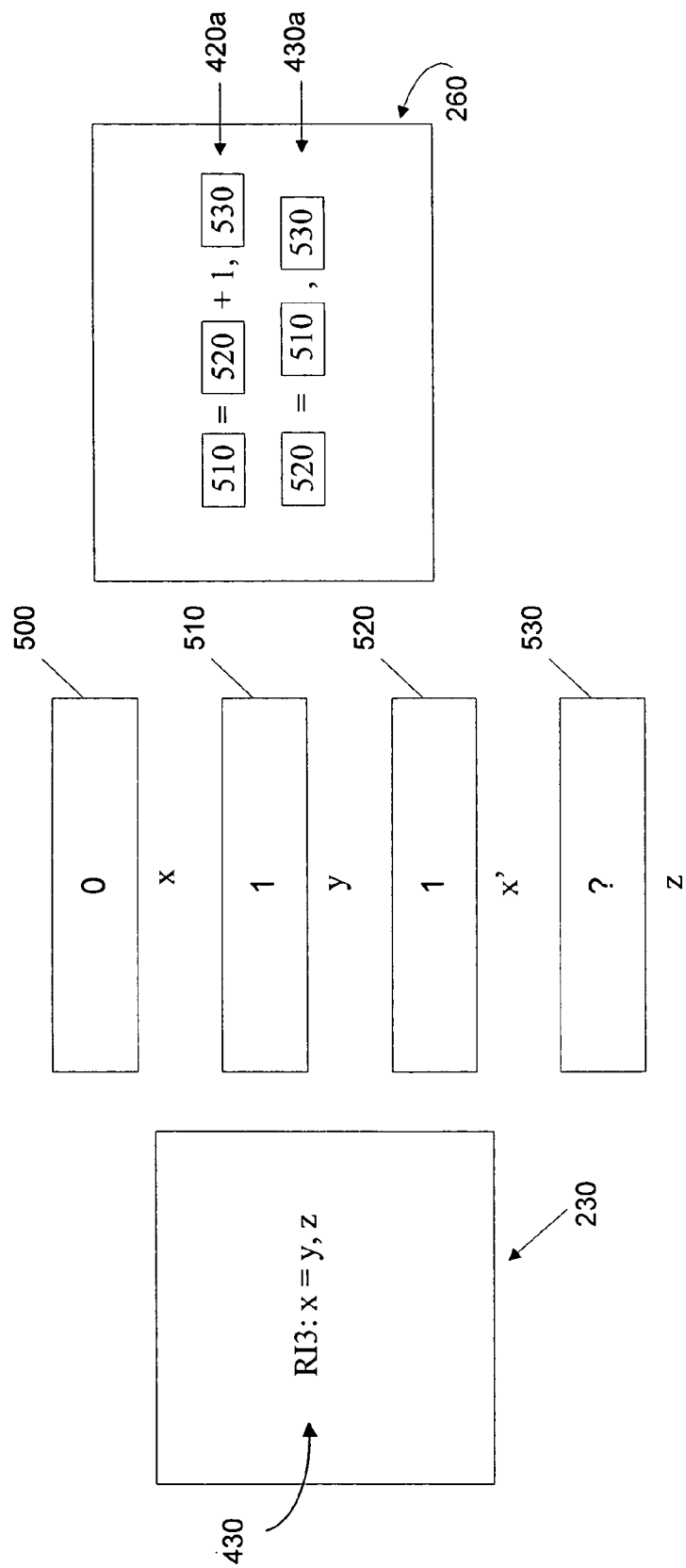

FIG. 25 illustrates a processing state of the processor 200 after processing the second loop instruction 430. The processor 200 fetches the loop instruction 430, and the renamer 430 obtains the loop instruction 420. Similar to the first loop instruction 420, the second loop instruction 430 also includes three object identifiers. The first object identifier for an object x is not flagged as a future value object or as a recursive future value object. Therefore, the renamer 250 associates the previously-allocated physical location 520 with the reference to the object x included in the second loop instruction 430.

The second object identifier included in the loop instruction 430 identifies an object y, which is also neither flagged as a future value object nor as a recursive future value object. The renamer 250, therefore, associates the previously-allocated physical location 510 with the reference to the object y.

The second loop instruction 430 also includes an object identifier for the object z, which represents the predicate guarding instruction 430. The renamer associates the previously allocated physical location 530 with the reference to the object z since the reference to the object z is not flagged as a recursive future value object or as a future value object.

After associating physical locations with the object identifiers included in the second loop instruction 430, the loop instruction 430 is forwarded to the reservation station 260. Since the instruction 430 also represents the initial iteration of the loop, the loop instruction 430 is released for execution. Upon releasing the second loop instruction 430 from the reservation station 260, a copy of the loop instruction 430 (hereinafter "copy instruction 430a"), including the predicate, remains in the reservation station 260.

The ALU 270 executes the loop instruction 430, and the register 520, which is associated with the object x, obtains a value (i.e., 1), and the processor 200 can signal the availability of the value stored in the physical location 520. It should be noted, however, that, in some embodiments, although the copy instruction 420a is signaled that a value is available in physical location 520 for object x, the copy instruction 420a and the copy instruction 430a are not released for execution since a value for the object z is still not available. The value of the object z can be used to determine whether the copy instructions 420a and 430a should be released and executed again.

In some embodiments, the copy instructions 420a and 430a are released without waiting for a value of the object z. For example, the processor 200 can be configured to speculatively release multiple copies of a recursive instruction. The processor 200 can predict future iterations of recursive instructions and can release as many copies of a recursive instruction that the processor 200 predicts will be processed or as many copies of a recursive instruction that the processor 200 has resources to process.

Figure 26:
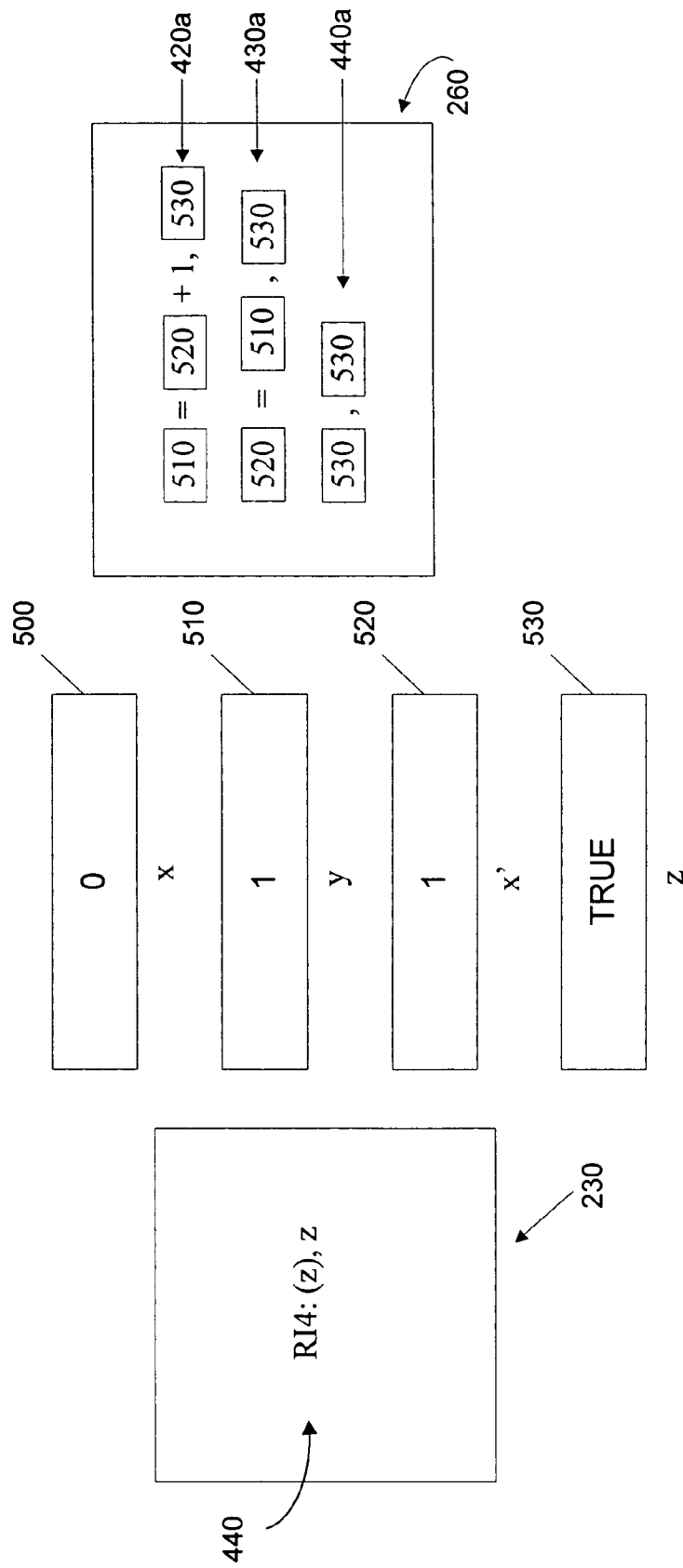

FIG. 26 illustrates another processing state of the processor 200 after processing the branch instruction 440. The processor 200 fetches the branch instruction 440, and the renamer 430 obtains the branch instruction 440. The branch instruction 440 only includes the object identifier z, which represents a predicate value. The object identifier z included in the branch instruction is not flagged as a future value object or as a recursive future value object, and therefore the renamer 250 associates the previously-allocated physical location 540 with the reference to the object z included in the branch instruction 440.

After associating the physical location 530 with the object identifier included in the branch instruction 440, the branch instruction 440 is forwarded to the reservation station 260. Since the branch instruction 440 represents the initial iteration of the loop and does not include any data dependencies, the branch instruction 440 is released for execution. Upon releasing the branch instruction 440 from the reservation station 260, however, a copy of the branch instruction 440 (hereinafter "copy instruction 440a"), is stored in the reservation station 260.

The ALU 270 executes the branch instruction 440, and the register 530, which is allocated for a value of the object z, obtains a value (e.g., "TRUE"). The processor 200 can then signal the availability of the value stored in the physical location 530 to the copy instruction 420a, the copy instruction 430a, and the copy instruction 440a, which were waiting on a value of the object z.

In some embodiments, if the value of the object z is set to "FALSE," the copy instructions 420a, 430a, and 440a are not released from the reservation station 260 since the object z is associated with the predicate guarding the loop instructions 420 and 430 and the branch instruction 440. If the value of the object z is set to "FALSE," the copy instructions 420a, 430a, and 440a should be not executed and can be removed or eliminated from the reservation station 260.

If, however, the value of the object z is set to "TRUE," the copy instructions 420a, 430a, and 440a can be released from the reservation station 260 and can be executed. The copy instruction 420a, 430a, and 440a can also be released without considering the value of the object z as described above.

Figure 27:
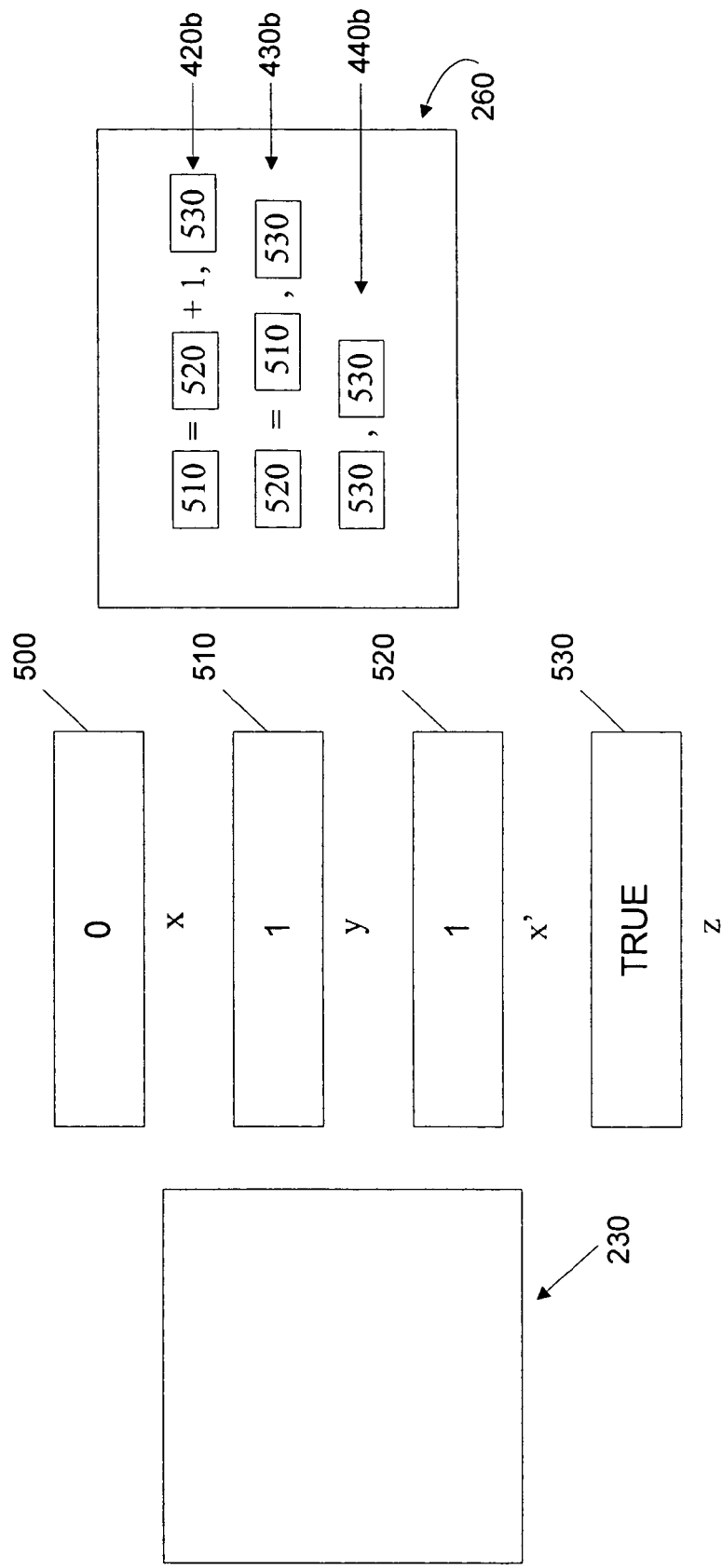
Figure 28:
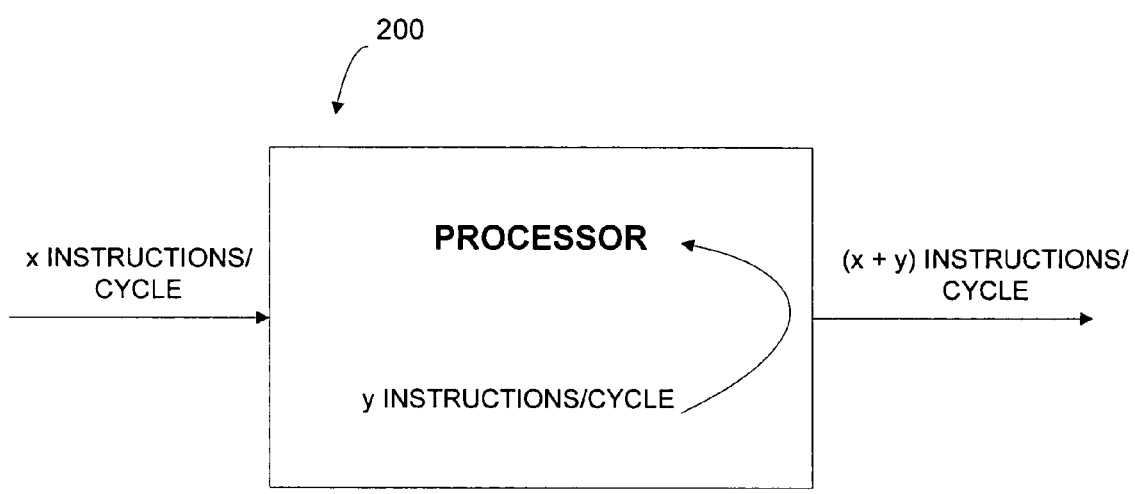
FIG. 28 illustrates exemplary internal production performed with a processor executing recursive instructions.

As illustrated in FIG. 27, upon being released from the reservation station 260, the copy instructions 420a, 430a, and 440a can leave copy instructions 420b, 430b, and 440b respectively in the reservation station 260. The second copy instructions 420b, 430b, and 440b, can remain in the reservation station 260 until receiving another signal that a value of the object z is available. In other words, once a recursive instruction is stored to the reservation station 260, the recursive instruction can be repeatedly issued for execution as long as the guarding predicate is true. The recursive instruction is destroyed when the predicate becomes false. As a result it is possible to unravel loop iterations as subsequent instructions (e.g., subsequent instructions included in the loop) are being fetched. For example, multiple instances of the same instruction belonging to future loop iterations can be released from the reservation station and scheduled for execution as the loop body is being fetched. This process can exploit multiple flows of control and can provide processors freedom to unravel loops in a left to right fashion (i.e., instruction belonging to future iterations of an instruction can be scheduled for execution before instructions that follow the unraveled instruction). In some embodiments, processors unravel loops using conventional sequential means of expanding in a top-to-bottom fashion, and, as a result, if an instruction does not have loop carried dependencies, multiple instances of the same instruction are processed in parallel before those instructions that follow the loop-independent instruction. On the other hand, if an instruction includes loop carried dependencies, multiple instances of the instruction belonging to different loop iterations can execute as soon as their data dependencies are satisfied. In this respect, it is possible to fetch fewer instructions than instructions that are executed. Instructions are buffered in the reservation station 260 and unravel recursively from the reservation station as needed instead of re-fetching the instructions of the loop body multiple times.

As was illustrated in FIG. 22, backward branches can be generally eliminated and loop instructions can appear as a straight line of code to the instruction fetcher/cache 230 using the concepts of recursive instruction/predicate pairs. Therefore, if the processor 200 includes enough resources to cache the instructions included in a loop body in the reservation station 260, the instruction fetcher/cache 230 can fetch the instructions of the loop body once regardless of how many times the loop actually is executed. Caching instructions in the reservation 260 station can be viewed as internal production if the processor 200 is viewed as a system operating in a steady state. In other words, the processor 200 can execute and retire more instructions than it fetches. As illustrated in FIG. 27, buffering future instances of instructions in the reservation station 260 can increase the output or production rate of the processor 200. For example, the processor 200 can be configured to bring in x instructions on a single fetch cycle. However, in addition to processing and outputting results for the x instructions fetched, the processor 200 can also process and output results for y instructions buffered in the reservation station 260. Thus, the processor 200 can potentially process (x+y) instructions on a single cycle even though only x instructions were fetched.

Also, since loops rewritten as predicate-guarded recursive instructions appear as straight sequences of instructions to the instruction fetcher/cache 230, the instruction fetcher/cache 230 can "move ahead" of the instructions being executed with the ALU 270. For example, the instruction fetcher/cache 230 can be fetching instructions sequentially distant or separated from the instructions currently be executed with the ALU 270. Creating "distance" between the instructions being fetched and the instructions being executed can facilitate the use of more sophisticated branch prediction algorithms since more "future" instructions are being fetched and therefore can be examined or considered when attempting to predict a branch path.

In addition, recursive instructions released from the reservation station 260 can leave multiple copies in the reservation station 260. Providing multiple copies of a recursive instructions allows a recursive instruction to unravel multiple iterations ahead.

It should be noted that post-loop instructions can be data-dependent on values computed within a loop and should be held in the reservation station 260 until a final (post-loop) value is available. In some embodiments, a busy bit is associated with a value produced by a recursive instruction such that the data-dependent instructions are held until a busy bit is set or cleared indicating that the recursive instruction is no longing modifying the value.

In some embodiments, control-independent instruction may be rewritten as recursive instructions. For example, if control-independent instructions are reordered before control-dependent instructions and branch prediction is performed, the control-independent instructions may be executed, but may need to be re-executed if a branch prediction is incorrect. By leaving a copy of the control-independent instructions in the reservation station 260 guarded with a predicate specifying whether the branch prediction was correct or incorrect, control-independent instructions can reissue from the reservation station 260 as needed. Therefore, they do not need to be held until a branch prediction is verified or validated.

Various features and advantages of the invention are set forth in the following claims.

The invention claimed is:

1. A method of ordering software instructions before execution and executing the ordered software instructions, the method comprising:
   prior to execution, ordering software instructions by placing a first instruction that consumes a value of an object before a second instruction that produces the value of the object such that the first instruction enters a processing pipeline in a processor before the second instruction; and
   during execution of the software instructions, allocating a physical location in memory for the value of the object upon processing the first instruction.

2. A method as claimed in claim 1, further comprising flagging a reference to the object in the first instruction as a future value object.

3. A method as claimed in claim 2, wherein flagging a reference to the object in the first instruction includes setting a value of a bit.

4. A method as claimed in claim 1, further comprising determining a first instruction set that includes control-independent instructions.

5. A method as claimed in claim 4, wherein the first instruction is included in the first instruction set.

6. A method as claimed in claim 5, further comprising determining a second instruction set that includes control-dependent instructions.

7. A method as claimed in claim 6, wherein the second instruction is included in the second instruction set.

8. A method as claimed in claim 6, further comprising adding a copy of the second instruction to the second instruction set.

9. A method of processing software instructions, the method comprising:
   upon executing in a processor a first instruction that consumes a value of an object that is not defined, allocating a physical location to a value of the object; and
   upon executing in a processor a second instruction that produces the value of the object after executing the first instruction, mapping the value produced with the second instruction to the physical location as designated by a physical location identifier stored in a map table.

10. A method as claimed in claim 9, further comprising flagging a reference to the object in the first instruction as a future value object.

11. A method as claimed in claim 10, wherein flagging a reference to the object in the first instruction includes setting the value of a bit.

12. A method as claimed in claim 9, further comprising determining a first instruction set that includes control-independent instructions.

13. A method as claimed in claim 12, further comprising selecting the first instruction from the first instruction set.

14. A method as claimed in claim 9, further comprising determining a second instruction set that includes control-dependent instructions.

15. A method as claimed in claim 14, further comprising selecting the second instruction from the second instruction set.

16. A method as claimed in claim 14, further comprising adding a copy of the second instruction to the second instruction set.

17. A method as claimed in claim 9, further comprising holding the first instruction during execution to wait for the value of the object to be produced.

18. A method as claimed in claim 17, further comprising executing the second instruction and storing the value of the object to the physical location.

19. A method as claimed in claim 18, further comprising releasing the first instruction to complete execution after executing the second instruction.

20. A method as claimed in claim 19, further comprising executing the first instruction.

21. A system for organizing and processing an instruction set, the instruction set including a first instruction that consumes a value of an object and a second instruction that produces the value of the object, the system comprising:
   a computer running an instruction organizing application configured to order the instructions sequentially such that the first instruction is placed before the second instruction in the sequential order and to flag a reference to the object as a future value object in the first instruction; and
   a computer processor configured to allocate a physical location to the value of the object upon processing the first instruction and to map the value produced with the second instruction to the physical location.

22. A system as claimed in claim 21, wherein the computer processor is further configured to hold the first instruction to wait for the value of the object to be produced.

23. A system as claimed in claim 22, wherein the computer processor is further configured to execute the second instruction and store the value of the object to the physical location.

24. A system as claimed in claim 23, wherein the computer processor is further configured to release the first instruction after executing the second instruction.

25. A system as claimed in claim 24, wherein the computer processor is further configured to execute the first instruction.

26. A system as claimed in claim 21, wherein the computer running the instruction organizing application is configured to flag the object as a future value object in the first instruction by setting a value of a bit.

27. A system as claimed in claim 21, wherein the computer running the instruction organizing application is further configured to determine a first instruction set that includes control-independent instructions.

28. A system as claimed in claim 21, wherein the computer running the instruction organizing application is further configured to select the first instruction from the first instruction set.

29. A system as claimed in claim 21, wherein the computer running the instruction organizing application is further configured to determine a second instruction set that includes control-dependent instructions.

30. A system as claimed in claim 29, wherein the computer running the instruction organizing application is further configured to select the second instruction from the second instruction set.

31. A system as claimed in claim 29, wherein the computer running the instruction organizing application is further configured to add a copy of the second instruction to the second instruction set.

32. A system comprising:
a computer readable memory; and
a processor including a renamer configured to
obtain a first instruction from the computer readable memory, the first instruction including a future value object flag and a reference to a first object, wherein the future value object flag is set when the first instruction is a consumer instruction that consumes a value of the first object and the first instruction is ordered sequentially before a second instruction that produces the value of the first object,
allocate a first physical location for a value of the object and map the reference to the first object to the first physical location when the future value object flag is set, and
map the reference to the first object to a previously-allocated physical register as designated with a previously-allocated physical location identifier stored in a map table when the future value object flag is not set.

33. A processor as claimed in claim 32, wherein the renamer is further configured to store a physical location identifier to the map table corresponding to the first physical location when the future value object flag is set.

34. A processor as claimed in claim 32, wherein the renamer is further configured to obtain a third instruction including a recursive future value object flag and a reference to a second object, to allocate a second physical location for a future value of an object produced with a subsequent recursive instruction when the recursive future value object flag is set, and to map the reference to the second object to a previously-allocated physical register as designated with a previously-allocated register identifier stored in a map table.

35. A processor as claimed in claim 34, wherein the renamer is further configured to store a physical location identifier to the map table corresponding to the second physical location when the recursive future value object flag is set.

36. A processor as claimed in claim 32, further comprising a reservation station configured to hold the first instruction when the future value object flag is set and to release the first instruction once a second instruction producing the value of the object is executed with the processor.

37. A processor as claimed in claim 34, further comprising a reservation station configured to hold a copy of the third instruction and a predicate having a true state and a false state.

38. A processor as claimed in claim 37, wherein the reservation station is further configured to release the copy of the third instruction when the predicate has a true state.

39. A renamer comprising:
a computer readable memory containing a map table configured to store previously-allocated register identifiers that map an object identifier to a physical location, to receive an object identifier, and to transmit a previously-allocated physical location identifier; and
a register allocator configured to receive a future value object flag associated with an instruction and, if the future value object flag is set, to allocate a first physical location and transmit a first physical location identifier associated with the first physical location,
wherein the future value object flag associated with the instruction is set when the instruction consumes a value of the object and the instruction is scheduled for execution before a second instruction that produces the value of the object.

40. A renamer as claimed in claim 39, further comprising a multiplexer configured to receive the allocated physical location identifier and to receive the previously allocated physical location identifier.

41. A renamer as claimed in claim 39, wherein the register allocator is further configured to store the first physical location identifier to the map table if the future value object is set.

42. A renamer as claimed in claim 39, wherein the register allocator is further configured to receive a recursive future value object flag and to allocate a second physical location if the recursive future value object is set.

43. A renamer as claimed in claim 42, wherein the renamer is further configured to store the second physical location identifier corresponding to the second physical location if the recursive future value object flag is set.

* * * * *